US011922847B2

(12) United States Patent
Chen et al.

(10) Patent No.: US 11,922,847 B2
(45) **Date of Patent: *Mar. 5, 2024**

(54) DISPLAY APPARATUS, DRIVE CHIP, AND ELECTRONIC DEVICE

(71) Applicant: HONOR DEVICE CO., LTD., Guangdong (CN)

(72) Inventors: Pengming Chen, Shenzhen (CN); Jide Liang, Shenzhen (CN); Ruiliang Li, Shenzhen (CN); Feng Zhang, Shenzhen (CN); Jiandong Deng, Shenzhen (CN); Muyao Li, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/795,688

(22) PCT Filed: Sep. 22, 2021

(86) PCT No.: PCT/CN2021/119633

§ 371 (c)(1),
(2) Date: Jul. 27, 2022

(87) PCT Pub. No.: WO2022/068651

PCT Pub. Date: Apr. 7, 2022

(65) Prior Publication Data

US 2023/0222951 A1 Jul. 13, 2023

(30) Foreign Application Priority Data

Sep. 30, 2020 (CN) ........................ 202011063292.5

(51) Int. Cl.
*G09G 5/18* (2006.01)
*G09G 3/20* (2006.01)

(52) U.S. Cl.
CPC .......... *G09G 3/20* (2013.01); *G09G 2330/08* (2013.01)

(58) Field of Classification Search
CPC ............................ G09G 3/20; G09G 2330/08
USPC ........................................................ 345/204
See application file for complete search history.

(56) References Cited

U.S. PATENT DOCUMENTS

| | | | |
|---|---|---|---|
| 8,830,153 | B2 | 9/2014 | Huang et al. |
| 10,002,917 | B2 | 6/2018 | Xu |
| 2005/0110738 | A1 | 5/2005 | Kim et al. |
| 2013/0147773 | A1 | 6/2013 | Jin et al. |

(Continued)

FOREIGN PATENT DOCUMENTS

| | | | |
|---|---|---|---|
| CN | 1797141 | A | 7/2006 |
| CN | 101388199 | A | 3/2009 |

(Continued)

*Primary Examiner* — Abdul-Samad A Adediran
(74) *Attorney, Agent, or Firm* — Fish & Richardson P.C.

(57) ABSTRACT

Disclosed are a display apparatus, a drive chip, and an electronic device. When determining that a disconnected signal line exists, a drive chip sends a control signal to a signal line repair module, so that a shift output end of a first shift unit corresponding to the disconnected signal line outputs an enable signal, so as to control a corresponding connection switch in a connection switch group to be turned on, to enable the disconnected signal line to be electrically connected to a repair line. The display apparatus may repair a disconnected signal line without being returned to a factory and a manual operation.

10 Claims, 13 Drawing Sheets

(56) References Cited

U.S. PATENT DOCUMENTS

| | | | | |
|---|---|---|---|---|
| 2014/0104251 | A1 | 4/2014 | Zhang et al. | |
| 2016/0140935 | A1* | 5/2016 | Hwang | G09G 3/20<br>345/204 |
| 2018/0180958 | A1 | 6/2018 | Huang | |

FOREIGN PATENT DOCUMENTS

| | | | |
|---|---|---|---|
| CN | 102879964 | A | 1/2013 |
| CN | 103838047 | A | 6/2014 |
| CN | 105575305 | A | 5/2016 |
| CN | 105652482 | A | 6/2016 |
| CN | 105974624 | A | 9/2016 |
| CN | 106328038 | A | 1/2017 |
| CN | 106445249 | A | 2/2017 |
| CN | 110806667 | A | 2/2020 |
| CN | 211603773 | U | 9/2020 |

* cited by examiner

DISPLAY APPARATUS, DRIVE CHIP, AND ELECTRONIC DEVICE

CROSS REFERENCE TO RELATED APPLICATIONS

This application is a National Stage of International Application No. PCT/CN2021/119633, filed Sep. 22, 2021, which claims priority to Chinese Patent Application No. 202011063292.5, filed Sep. 30, 2020. The disclosures of which are incorporated herein by reference in their entireties.

TECHNICAL FIELD

This application relates to the field of display technologies, and in particular, to a display apparatus, a drive chip, and an electronic device.

BACKGROUND

With development of display technologies, mobile phones, computers, televisions, and smart wearable devices with display functions are becoming increasingly important in people's work and life, and users have higher requirements for quality of these display products. In both a liquid crystal display technology and an organic self-luminous display technology, various signal lines need to be disposed in a display panel to implement display. However, due to a process of the signal lines or other reasons, there is a risk of disconnection of the signal lines, and consequently, black lines or white lines appear during display, which affects a display effect, or even affects accuracy of displayed information.

Currently, a method for repairing a disconnected signal line of a display is to physically connect the disconnected signal line to a reserved signal line through laser sintering, and electrically connect the reserved signal line to an output end of a drive chip to wind from a non-display area of the display to an end of the signal line away from the drive chip. A signal transmitted by the reserved signal line is the same as a signal that should be transmitted by the disconnected signal line, thereby ensuring that the display can display normally.

However, the existing method for repairing a disconnected line requires a manual operation after the display is returned to a factory. This process is cumbersome, costly, and inefficient.

SUMMARY

This application provides a display apparatus, a drive chip, and an electronic device, so as to resolve the foregoing problems.

According to a first aspect, this application provides a display apparatus, including a plurality of sub-pixels for light-emitting display, a plurality of signal lines that are electrically connected to the sub-pixels and provide a signal required for light-emitting display to the sub-pixels, a signal line repair module that is electrically connected to the plurality of signal lines and configured to repair a disconnected signal line, and a drive chip that is electrically connected to the plurality of signal lines and the signal line repair module and provide the signal required for controlling the light-emitting display of the sub-pixels to the signal lines; the signal line repair module includes at least one repair line, at least one connection switch group disposed in a one-to-one correspondence with the at least one repair line, and a first shift unit group including a plurality of stages of first shift units; the connection switch group includes a plurality of connection switches, the plurality of connection switches are disposed in a one-to-one correspondence with the plurality of signal lines, input ends of the connection switches in the same connection switch group are electrically connected to different signal lines respectively, and output ends thereof are electrically connected to the corresponding repair lines; the plurality of connection switches in each connection switch group are disposed in a one-to-one correspondence with a plurality of stages of first shift units, each first shift unit includes a shift output end, and the shift output ends of the first shift units are electrically connected to control ends of the corresponding connection switches; when determining that a disconnected signal line exists, the drive chip sends a control signal, to enable the disconnected signal line to be electrically connected to the repair line in the signal line repair module; and specifically, that the drive chip sends a control signal to the signal line repair module, to enable the disconnected signal line to be electrically connected to the repair line in the signal line repair module includes: sending a control signal to the signal line repair module, so that the shift output end of the first shift unit corresponding to the disconnected signal line outputs an enable signal, so as to control a corresponding connection switch in a connection switch group to be turned on, to enable the disconnected signal line to be electrically connected to one repair line.

According to a second aspect, this application provides a drive chip, where the drive chip is configured to: provide a signal to a plurality of signal lines to control sub-pixels to perform light-emitting display; and when determining that a disconnected signal line exists, provide a control signal to enable the disconnected signal line to be electrically connected to a repair line in a signal line repair module, where providing a control signal to enable the disconnected signal line to be electrically connected to a repair line in a signal line repair module includes: sending a control signal to the signal line repair module, to control a shift output end of a first shift unit corresponding to the disconnected signal line to output an enable signal, and control a corresponding connection switch in a connection switch group to be turned on, so that the disconnected signal line is electrically connected to one repair line.

According to a third aspect, this application provides an electronic device, including the display apparatus according to the first aspect.

In the display apparatus, the drive chip, and the electronic device according to embodiments of this application, the signal line repair module may repair a disconnected signal line, that is, the display apparatus may repair the disconnected signal line without being returned to a factory, which is easy to implement, has high repair efficiency, and requires low costs; and a structure for controlling connection of connection switches is first shift units that may sequentially output enable signals, so that manual laser sintering is not required, and accuracy is high.

DESCRIPTION OF EMBODIMENTS

Terms used in implementations of this application are only used to explain specific embodiments of this application, and are not intended to limit this application.

Figure 1:
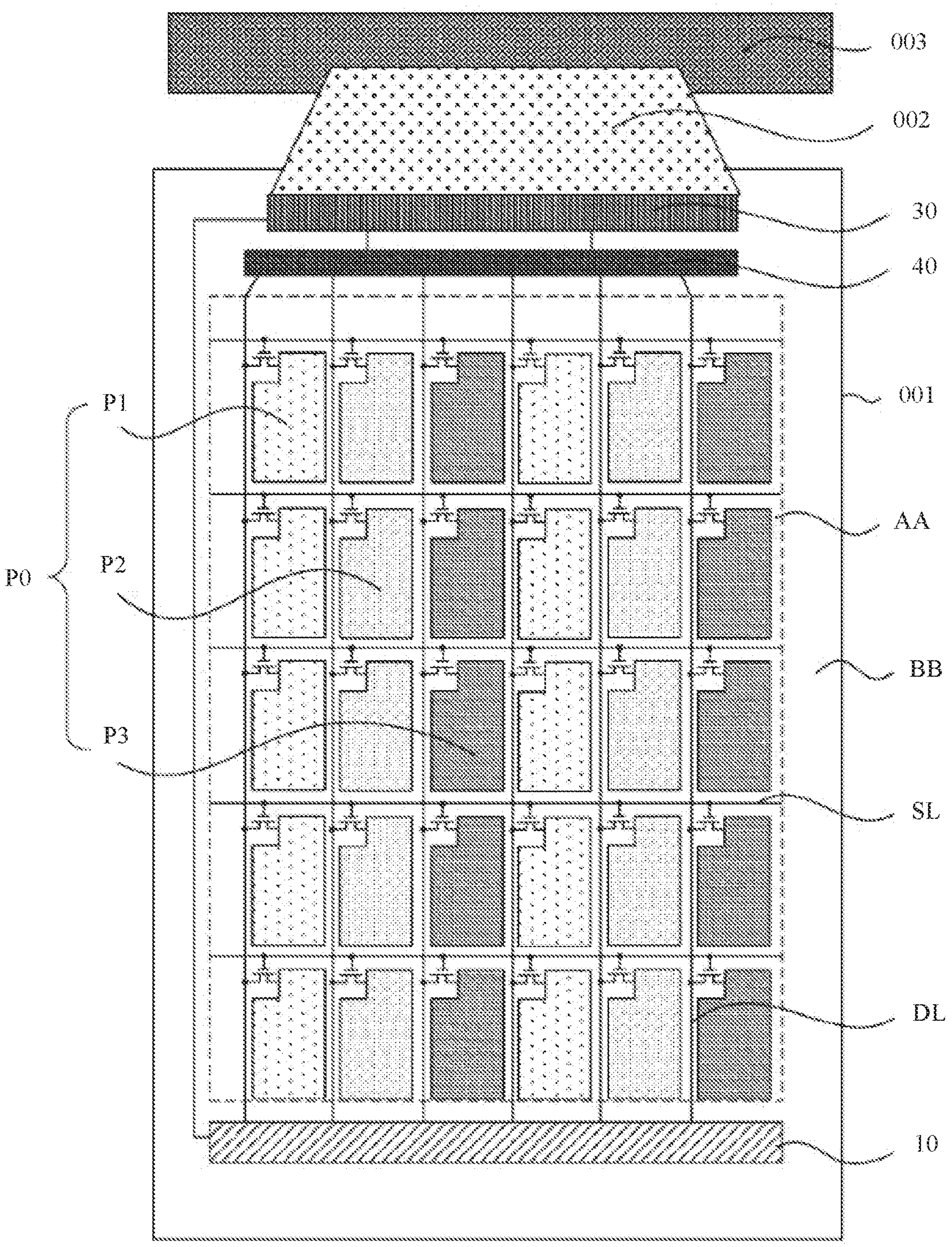
FIG. 1 is a schematic diagram of a display apparatus according to an embodiment of this application.
Figure 2:
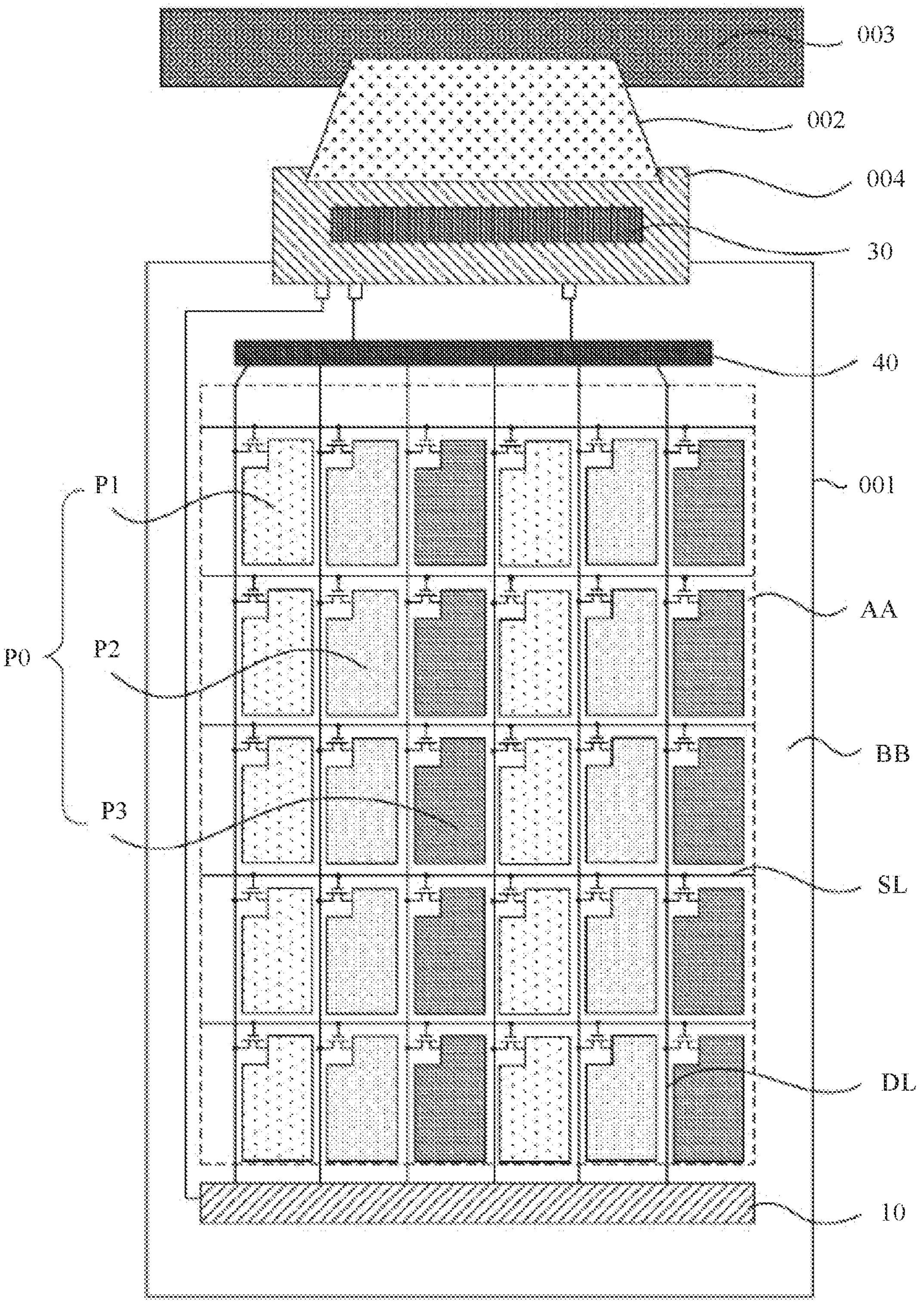
FIG. 2 is a schematic diagram of another display apparatus according to an embodiment of this application.

FIG. 1 is a schematic diagram of a display apparatus according to an embodiment of this application, and FIG. 2 is a schematic diagram of another display apparatus according to an embodiment of this application.

As shown in FIG. 1 and FIG. 2, the display apparatus according to this embodiment of this application includes a display panel 001, and the display panel 001 includes a display area AA and a non-display area BB surrounding the display area AA. A plurality of signal lines are disposed in the display area AA. The plurality of signal lines include first signal lines DL and second signal lines SL, extension directions of the first signal lines DL and the second signal lines SL cross each other, and the first signal lines DL and the second signal lines SL cross to define a plurality of sub-pixels P0. The sub-pixels P0 are used for light-emitting display, the first signal lines DL and the second signal lines SL are electrically connected to the corresponding sub-pixels P0, and the sub-pixels P0 provide a signal required for light-emitting display. The plurality of sub-pixels P0 include first color sub-pixels P1, second color sub-pixels P2, and third color sub-pixels P3. The non-display area BB includes a signal line repair module 10, and the signal line repair module 10 may repair a disconnected first signal line DL in a signal line repair stage and a display stage of the display apparatus.

It should be noted that the signal line repair module 10 is electrically connected to a plurality of first signal lines DL, and may repair the disconnected first signal line DL, and the first signal line DL may be either a data line or a scanning line. The signal line repair module 10 may also be electrically connected to a plurality of second signal lines SL, and may repair a disconnected second signal line SL. The first signal lines DL may be data lines that extend in a column direction and are arranged in a row direction, and the first signal lines DL may provide a data signal required for light-emitting display to the sub-pixels P0. The second signal lines SL may be scanning lines that extend in the row direction and are arranged in the column direction, and the second signal lines SL may provide a scanning signal required for light-emitting display to the sub-pixels P0. Alternatively, the first signal lines DL may be scanning lines that extend in the row direction and are arranged in the column direction, and the first signal lines DL may provide a scanning signal required for light-emitting display to the sub-pixels P0. The second signal lines SL may be data lines extending in the column direction and arranged in the row direction, and the second signal lines SL may provide a data signal required for light-emitting display to the sub-pixels P0. In this embodiment of this application, the inventive concept of this application is mainly explained by using the signal line repair module 10 for repairing the first signal lines DL as an example, but it may be understood that the signal line repair module 10 in this embodiment of this application may also be configured to repair the second signal lines SL in the display panel 001.

In an embodiment, the display apparatus may be a liquid crystal display apparatus, and the display panel 001 includes an array substrate, a color film substrate, and a liquid crystal molecular layer located between the array substrate and the color film substrate. The array substrate includes a plurality of pixel circuits located in the display area AA, the color film substrate includes a color resist layer and a black matrix, and the color resist layer includes at least color resists of different colors. Optionally, the display panel 001 further includes a touch module located on a side of the color film substrate away from the array substrate. In this embodiment of this application, the signal line repair module 10 is added to the display panel 001, where the signal line repair module 10 is located in the non-display area BB, and the signal line repair module 10 is disposed on the array substrate.

In another embodiment, the display apparatus may alternatively be an organic light emitting display apparatus, and the display panel 001 includes an array substrate, a light-emitting device layer, and a packaging structure that are sequentially arranged. Optionally, the display panel 001 further includes a touch module located on a side of the packaging structure away from the array substrate. The light-emitting device layer includes a plurality of light-emitting devices, and the light-emitting devices each include an anode, a light-emitting layer, and a cathode that are stacked. The packaging structure is configured to package and protect the light-emitting devices to ensure service lives of the light-emitting devices. In this embodiment of this application, the signal line repair module 10 is added to the display panel 001, where the signal line repair module 10 is located in the non-display area BB, and the signal line repair module 10 is disposed on the array substrate.

In another embodiment, the display apparatus may alternatively be any display apparatus in an existing technology, such as a micro LED (Light Emitting Diode, light emitting diode) display apparatus or an electrophoretic display apparatus.

The display apparatus according to this embodiment of this application further includes a drive chip 30, and the drive chip 30 is configured to provide a signal required for controlling light-emitting display of the sub-pixels P0 to the first signal lines DL and the second signal lines SL. The drive chip may use a line disconnection detection circuit to implement automatic detection of a disconnected signal line. For details, refer to patent application No. CN202011014217.X filed on Sep. 24, 2020 and entitled "METHOD FOR DETECTING DEFECT OF DISPLAY LINE". Certainly, the display apparatus may also detect whether a signal line is subjected to a disconnection fault by using another method. Details are not described herein again.

In an embodiment of this application, as shown in FIG. 1 and FIG. 2, the signal line repair module 10 is disposed at an end of each first signal line DL in an extension direction, so as to facilitate electrical connection to the first signal line DL. In an implementation, as shown in FIG. 1, a drive chip 30 is disposed at one end of each first signal line DL, the drive chip 30 is electrically connected to a mainboard 003 by using a flexible circuit board 002, and a signal line repair module 10 is disposed at the other end of the first signal line DL. In another implementation, as shown in FIG. 2, a chip on film 004 is bound to one end of each first signal line DL, a drive chip 30 is disposed on a flexible circuit board of the chip on film 004, the chip on film 004 is electrically connected to a mainboard 003 by using a flexible circuit board 002, and a signal line repair module 10 is disposed at the other end of the first signal line DL. In addition, the drive chip 30 may provide a signal to the first signal lines DL by using a multiplex selection circuit 40, that is, one port of the drive chip 30 corresponds to one input port of the multiplex selection circuit 40, and one input port of the multiplex selection circuit 40 corresponds to a plurality of output ports in a one-to-one correspondence with the first signal lines DL.

The signal line repair module 10 and the drive chip 30/multiplex selection circuit 40 are disposed at two opposite ends of each first signal line DL, and the signal line repair module 10 may repair a disconnected first signal line DL without preventing the drive chip 30 from providing a signal to the first signal lines DL.

Figure 3:
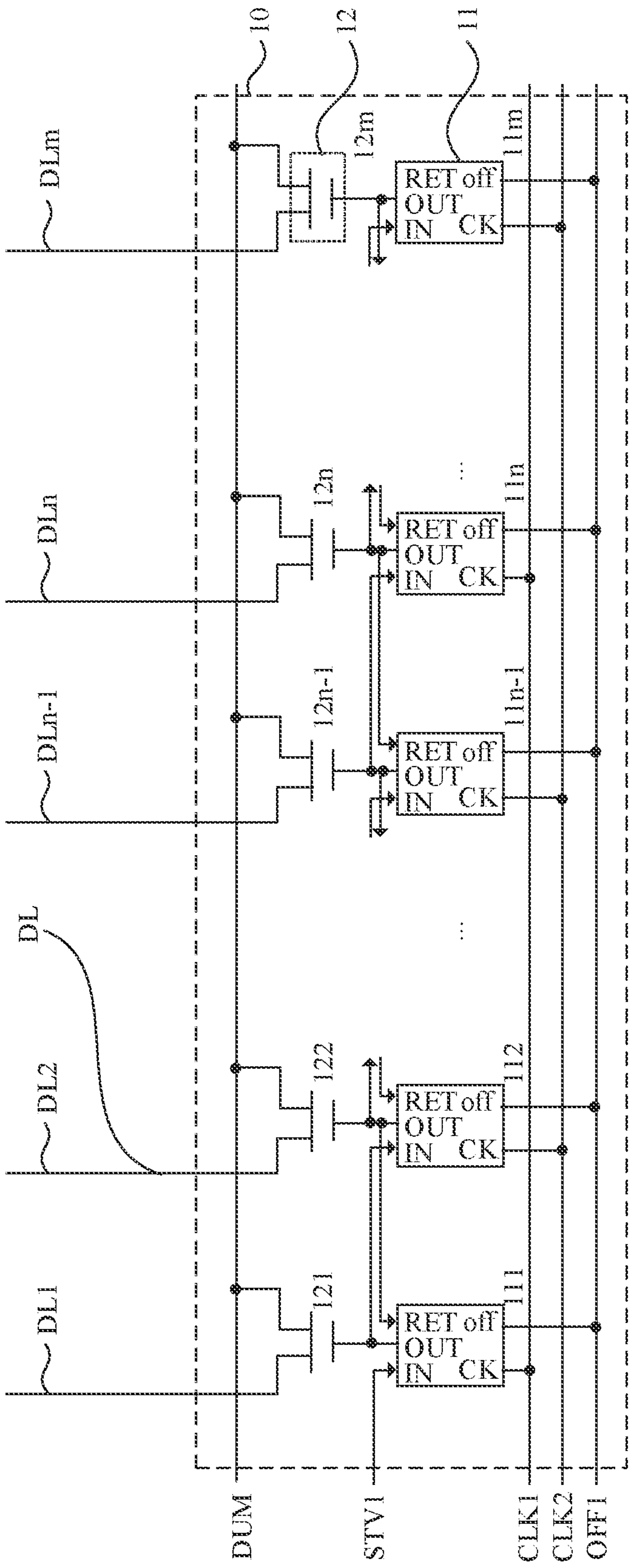
FIG. 3 is a partial enlarged view of a display apparatus according to an embodiment of this application.

FIG. 3 is a partial enlarged view of a display apparatus according to an embodiment of this application. As shown in FIG. 3, the signal line repair module 10 according to this embodiment of this application includes at least one connection switch group and at least one repair line DUM, and the at least one connection switch group and the at least one repair line DUM are disposed in a one-to-one correspondence. The connection switch group includes a plurality of connection switches 12, the plurality of connection switches 12 in the same connection switch group are disposed in a one-to-one correspondence with a plurality of first signal lines, input ends of the connection switches 12 are electrically connected to corresponding first signal lines DL, and output ends thereof are electrically connected to the corresponding repair lines DUM. When any one of the connection switches 12 is turned on, the first signal line DL and the repair line DUM that are electrically connected to the input end and the output end of the connection switch 12 respectively are electrically connected to each other. Then, when one first signal line DL is disconnected, by turning on the connection switch 12 electrically connected to the disconnected first signal line DL, the disconnected first signal line DL may be electrically connected to one repair line DUM, thereby repairing the disconnected first signal line DL.

As shown in FIG. 3, the signal line repair module 10 according to this embodiment of this application further includes a first shift unit group, and the first shift unit group includes a plurality of stages of first shift units 11, and shift output ends of the plurality of stages of first shift units 11 may sequentially output enable signals. The plurality of connection switches in each connection switch group are disposed in a one-to-one correspondence with the plurality of stages of first shift units, signals output from the shift output ends OUT of the first shift units 11 can control at least one corresponding connection switch 12 to be turned on or turned off, and at least one connection switch 12 controlled by each first shift unit 11 is electrically connected to the same first signal line DL. In this embodiment of this application, the shift output ends OUT of the first shift units 11 of the signal line repair module 10 sequentially output enable signals, so that the connection switches 12 electrically connected to the plurality of stages of first shift units 11 respectively may be controlled to be sequentially turned on. When a first signal line DL is disconnected, in the signal line repair stage, the first shift unit 11 corresponding to the connection switch 12 electrically connected to the disconnected first signal line DL outputs an enable signal, and the enable signal output by the first shift unit 11 controls the connection switch 12 electrically connected to the disconnected first signal line DL to be turned on. In addition, in the display stage, the connection switch 12 electrically connected to the disconnected first signal line DL may still be turned on, so that the disconnected first signal line DL may also receive a signal in the display stage, while other connection switches 12 are turned off and therefore do not affect normal signal reception of the first signal line DL.

The drive chip 30 is electrically connected to a plurality of first signal lines DL and the signal line repair module 10, and is configured to provide a signal required for controlling light-emitting display of the sub-pixels to the first signal lines DL.

When determining that a first signal line DL is disconnected, the drive chip 30 sends a control signal to the signal line repair module 10, so that the disconnected first signal line DL is electrically connected to a repair line DUM of the signal line repair module 10. Specifically, the drive chip 30 outputs a signal to the first shift unit 11, so that the shift output end of the first shift unit 11 corresponding to the disconnected first signal line DL outputs an enable signal, so as to control a corresponding connection switch 12 in a connection switch group to be turned on, to enable the disconnected signal line DL to be electrically connected to one repair line.

If a position at which a first signal line DL is disconnected is in the display area AA, in the display stage, a line segment of the disconnected first signal line DL that is electrically connected to the signal line repair module 10 may also receive a display signal, and the display signal is transmitted by a repair line DUM repairing the first signal line DL and may be the same as the original display signal of the first signal line DL. A line segment of the disconnected first signal line DL that is not electrically connected to the signal line repair module 10 may normally receive the display signal. If a position at which a first signal line DL is disconnected is in the non-display area BB, in the display stage, the disconnected first signal line DL may receive a display signal, and the display signal is transmitted by a repair line DUM repairing the first signal line DL and may be the same as the original display signal of the first signal line DL.

The display apparatus according to this embodiment of this application includes a signal line repair module 10, and the signal line repair module 10 may repair a disconnected first signal line DL, that is, the display apparatus may repair the disconnected first signal line DL without being returned to a factory, which is easy to implement, has high repair efficiency, and requires low costs. In this embodiment of this application, a structure for controlling connection of the connection switches 12 is the first shift units 11 that output enable signals, so that manual laser sintering is not required, and accuracy is high.

In an embodiment of this application, the connection switch 12 may be a transistor, then the input end and the output end of the connection switch 12 may be a source and a drain of the transistor, respectively, and the shift output end OUT of the first shift unit 11 in the signal line repair module 10 is electrically connected to a gate of the transistor.

Figure 4:
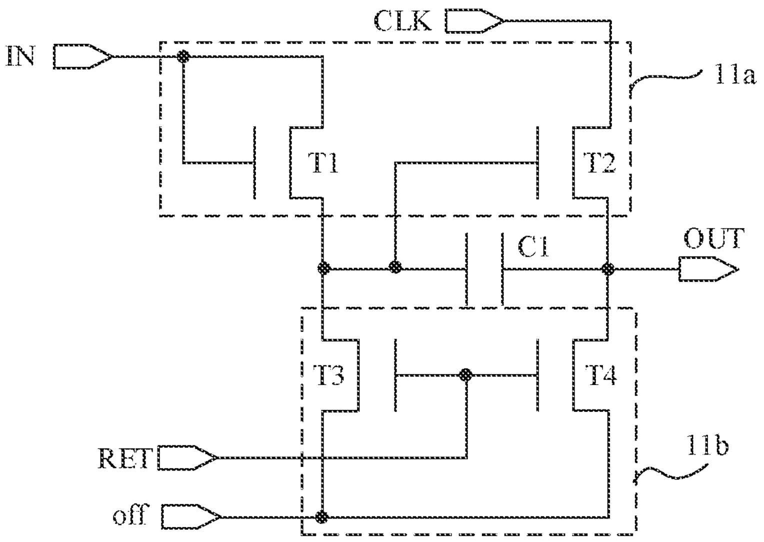
FIG. 4 is a schematic diagram of an equivalent circuit diagram of a shift unit according to an embodiment of this application.
Figure 5:
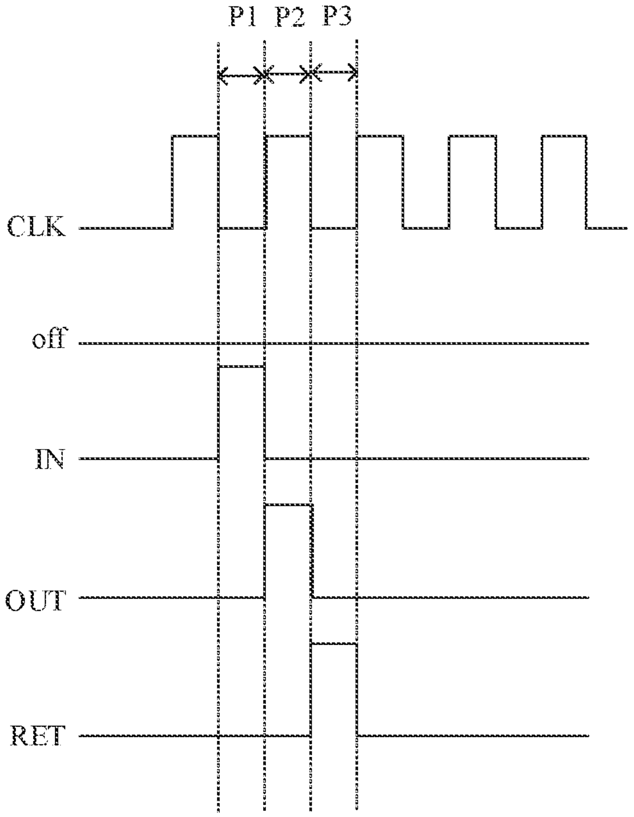
FIG. 5 is a sequence diagram of a shift unit according to the embodiment shown in FIG. 4.

FIG. 4 is a schematic diagram of an equivalent circuit diagram of a shift unit according to an embodiment of this application, and FIG. 5 is a sequence diagram of a shift unit according to the embodiment shown in FIG. 4. The structure and operation process of the first shift unit 11 in this embodiment of this application are illustrated below with reference to FIG. 4 and FIG. 5 as an example.

As shown in FIG. 4, a first shift unit 11 includes an output subunit 11*a* and a reset subunit 11*b*, where the output subunit 11*a* includes a turn-on signal input end IN and a clock signal input end CLK and the reset subunit 11*b* includes a reset control signal input end RET and a reset signal input end off. The output subunit 11*a* is configured to control, under control of a signal of the turn-on signal input end IN and a signal of the clock signal input end CLK, a shift output end OUT of the first shift unit 11 to output an enable signal that enables a connection switch 12 to be turned on. The reset subunit 11*b* is configured to control, under control of a signal of the reset control signal input end RET and a signal of the reset signal input end off, the shift output end OUT of the first shift unit 11 to output a reset signal, and the reset signal enables the connection switch 12 to be turned off.

The turn-on signal input end IN, the clock signal input end CLK, the reset control signal input end RET, and the reset signal input end off are all electrically connected to the drive chip 30, and obtain, from the drive chip 30, a signal for driving the first shift unit 11 to operate.

As shown in FIG. 4, the output subunit 11*a* further includes a first transistor T1, a second transistor T2, and a first capacitor C1. Agate and a source of the first transistor T1 are both connected to the turn-on signal input end IN, and a drain thereof is electrically connected to a first polar plate of the first capacitor C1; a gate of the second transistor T2 is electrically connected to the first polar plate of the first capacitor C1, a source thereof is electrically connected to the clock signal input end CLK, and a drain thereof is electrically connected to the shift output end OUT. A second polar plate of the first capacitor C1 is electrically connected to the shift output end OUT. As shown in FIG. 4, the reset subunit 11*b* includes a third transistor T3 and a fourth transistor T4. A gate of the third transistor T3 is electrically connected to the reset control signal input end RET, a source thereof is electrically connected to the reset signal input end off, and a drain thereof is electrically connected to the first polar plate of the capacitor; a gate of the fourth transistor T4 is electrically connected to the reset control signal input end RET, a source thereof is electrically connected to the reset signal input end off, and a drain thereof is electrically connected to the shift output end out.

It should be noted that FIG. 4, FIG. 5, and the following descriptions are based on an example in which T1 to T4 are N-type transistors. In fact, T1 to T4 may alternatively be P-type transistors. FIG. 5 shows three operating stages of the first shift unit 11.

In the first stage P1, when the turn-on signal input end IN receives an active signal, that is, a high-level signal, the first transistor T1 is turned on, and the active signal received by the turn-on signal input end IN is transmitted to the first polar plate of the first capacitor C1 by using the first transistor T1 that is turned on. Because the gate of the second transistor T2 is electrically connected to the first polar plate of the first capacitor C1, the second transistor T2 is turned on and remains in an on state. In this case, if a pulse signal received by the clock signal input end CLK is a low-level signal or an inactive-level signal, the shift output end OUT outputs a low-level signal or an inactive-level signal.

In the second stage P2, due to the action of the first capacitor C1, the second transistor T2 is continuously turned on, the pulse signal received by the clock signal input end CLK is an active signal, and the shift output end OUT outputs an enable signal.

In the third stage P3, when the reset control signal input end RET receives an active signal, that is, a high-level signal, the third transistor T3 and the fourth transistor T4 are turned on. The third transistor T3 provides a reset signal received by the reset signal input end off to the first polar plate of the first capacitor C1 and the gate of the second transistor T2, and the second transistor T2 is turned off. The fourth transistor T4 provides the reset signal received by the reset signal input end off to the shift output end OUT, to reset the shift output end OUT.

In an embodiment of this application, a plurality of stages of first shift units 11 included in a first shift unit group in the signal line repair module 10 are sequentially cascaded.

As shown in FIG. 3, the shift output end OUT of the first shift unit 11 of the previous stage in two adjacent stages of first shift units 11 among the cascaded first shift units 11 included in the signal line repair module 10 is electrically connected to the turn-on signal input end IN of the first shift unit 11 of the next stage, and the shift output end OUT of the first shift unit 11 of the next stage is electrically connected to the reset control signal input end RET of the first shift unit 11 of the previous stage. That is, the shift output end OUT of the first shift unit 11 of the previous stage may not only output an enable signal to control a connection switch 12 electrically connected thereto to be turned on, but also provide an enable signal to the turn-on signal input end IN of the first shift unit 11 of the next stage to control the first shift unit 11 of the next stage to start operating; and the shift output end OUT of the first shift unit 11 of the next stage may not only output an enable signal to control a connection switch 12 electrically connected thereto to be turned on, but also may provide an enable signal to the reset control signal input end RET of the first shift unit 11 of the previous stage to control the first shift unit 11 of the previous stage to stop operating. It should be noted that a turn-on signal input end IN of a first-stage shift unit among the cascaded first shift units 11 is electrically connected to a start signal line, for example, a first start signal line STV1, and the start signal line may provide an enable signal to the turn-on signal input end IN of the first-stage shift unit.

As shown in FIG. 3, clock signal input ends CLK of two adjacent stages of first shift units 11 among the cascaded first shift units 11 included in the signal line repair module 10 are connected to different clock signal lines. As shown in FIG. 3, clock signal input ends CLK of a plurality of stages of first shift units 11 in the signal line repair module 10 are alternately electrically connected to the first clock signal line CLK1 and the second clock signal line CLK2, and the first clock signal line CLK1 and the second clock signal line CLK2 output pulse signals alternately, so that the first shift units 11 cascaded in the signal line repair module 10 may sequentially output enable signals in cooperation with a signal received by the turn-on signal input end IN.

As shown in FIG. 3, reset signal input ends off of the first shift units 11 included in the signal line repair module 10 may be all electrically connected to a same reset signal line, and the reset signal line may continuously transmit reset signals in a signal line repair stage. For example, the reset signal input ends off are electrically connected to a first reset signal line OFF1, and the first reset signal line OFF1 continuously outputs reset signals in the signal line repair stage.

Figure 6:
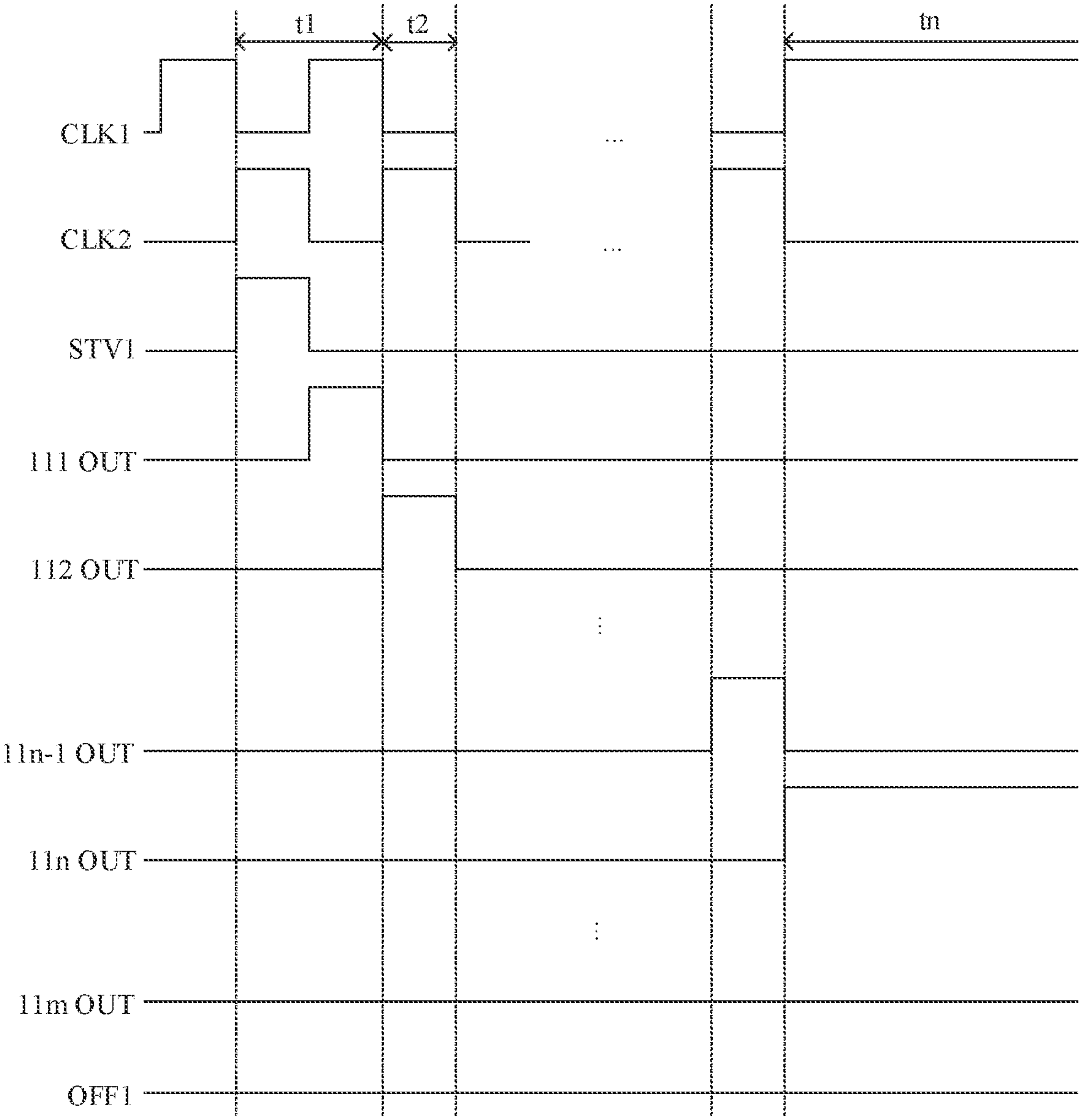
FIG. 6 is a sequence diagram of a signal line repair stage of the display apparatus shown in FIG. 3.

FIG. 6 is a sequence diagram of a signal line repair stage of the display apparatus shown in FIG. 3. The operation process of the signal line repair module 10 in this application is described below with reference to FIG. 3 and FIG. 6. As shown in FIG. 3, the signal line repair module 10 includes m stages of cascaded first shift units 11: a first-stage first shift unit 111, a second-stage first shift unit 112, . . . , a $(n-1)^{th}$-stage first shift unit 11(*n*−1), an $n^{th}$-stage shift unit 11*n*, . . . , an $m^{th}$-stage first shift unit 11*m*, where m is a positive integer greater than or equal to 3. One connection switch group of the signal line repair module 10 includes m connection switches 12: a first connection switch 121, a second connection switch 122, . . . , a $(n-1)^{th}$ connection switch 12(*n*−1), an $n^{h}$ connection switch 12*n* . . . and an $m^{th}$ connection switch 12*m*. The display area AA of the display panel 001 may include m first signal lines DL: a first first signal line DL1, a second first signal line DL2, . . . , and a $(n-1)^{th}$ first signal line DL(n−1), an $n^{th}$ first signal line DLn, . . . , and an $m^{th}$ first signal line DLm. Input ends of the m first shift units 11 in one connection switch group are separately electrically connected to the m first signal lines DL. Assuming that the $n^{th}$ first signal line DLn is disconnected, a specific operation process in which the signal line repair module 10 repairs the $n^{th}$ first signal line DLn is as follows:

At a time t1, the turn-on signal input end IN of the first-stage first shift unit 111 in the signal line repair module 10 receives an active signal transmitted by the first start signal line STV1, then the first clock signal line CLK1 connected to the clock signal input end CLK of the first-stage first shift unit 111 transmits an enable signal, then the shift output end OUT of the first-stage first shift unit 111 outputs the enable signal, the shift output end OUT of the first-stage first shift unit 111 controls the first connection switch 121 in one connection switch group to be turned on, and then the first first signal line DL1 is electrically connected to one repair line DUM.

At a time t2, the turn-on signal input end IN of the second-stage first shift unit 112 in the signal line repair module 10 receives the enable signal output by the shift output end OUT of the first-stage first shift unit 111, then the second clock signal line CLK2 connected to the clock signal input end CLK of the second-stage first shift unit 112 transmits an active signal, then the shift output end OUT of the second-stage first shift unit 112 outputs the enable signal, the shift output end OUT of the second-stage first shift unit 112 controls the second connection switch 122 in one connection switch group to be turned on, and then the second first signal line DL2 is electrically connected to one repair line DUM. In addition, the reset control signal input end RET of the first-stage first shift unit 111 receives the enable signal output by the shift output end OUT of the second-stage first shift unit 112, then a reset signal transmitted by the first reset signal line OFF1 controls the first-stage first shift unit 111 to be turned off and the shift output end OUT of the first-stage first shift unit 111 is reset, the first connection switch 121 that is in one connection switch group and that is controlled by the first-stage first shift unit 111 is turned off, and the first first signal line DL1 is disconnected from the repair line DUM.

By analogy, at a time tn, the turn-on signal input end IN of the $n^{th}$-stage first shift unit 11*n* in the signal line repair module 10 receives an enable signal output by the shift output end OUT of the $(n-1)^{th}$-stage first shift unit 111. Then, if the clock signal line connected to the clock signal input end CLK of the $n^{th}$-stage first shift unit 11*n*, for example, the first clock signal line CLK1, transmits an active signal, the shift output end OUT of the $n^{th}$-stage first shift unit 11*n* outputs an enable signal, and the shift output end OUT of the $n^{th}$-stage first shift unit 11*n* controls the $n^{th}$ connection switch 12*n* in one connection switch group to be turned on, so that the $n^{th}$ first signal line DLn is electrically connected to one repair line DUM. In addition, the reset control signal input end RET of the $(n-1)^{th}$-stage first shift unit 11(*n*−1) receives the enable signal output by the shift output end OUT of the $n^{th}$-stage first shift unit 1 in, then a reset signal transmitted by the first reset signal line OFF1 controls the $(n-1)^{th}$-stage first shift unit 11(*n*−1) to be turned off and the shift output end OUT of the $(n-1)^{th}$-stage first shift unit 11(*n*−1) is reset, the $(n-1)^{th}$ connection switch 12(*n*−1) that is in one connection switch group and that is controlled by the $(n-1)^{th}$-stage first shift unit 11(*n*−1) is turned off, and the $(n-1)^{th}$ first signal line DL(n−1) is disconnected from the repair line DUM.

At the time tn, a clock signal line of the signal line repair module 10 that is connected to the clock signal input end CLK of the $n^{th}$-stage first shift unit 11*n*, for example, the first clock signal line CLK1, keeps transmitting enable signals in the signal line repair stage and the display stage, while other clock signal lines continuously output disable signals, and then the shift output end OUT of the $n^{th}$-stage first shift unit 11*n* continuously outputs enable signals, while other first shift units 11 are continuously turned off. Then, the $n^{th}$ first signal line DLn is continuously electrically connected to one repair line DUM, and therefore, repair of the $n^{th}$ first signal line DLn can be completed.

Figure 7:
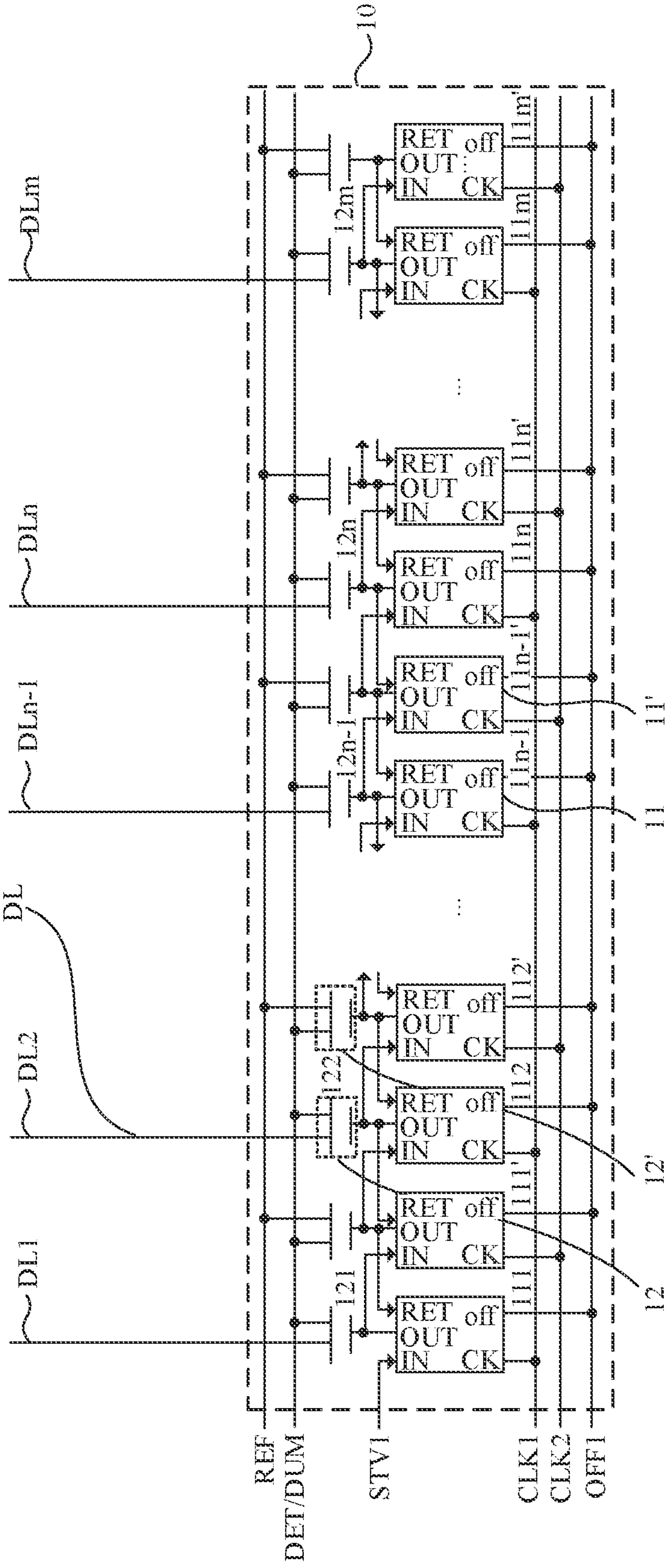
FIG. 7 is a partial enlarged view of another display apparatus according to an embodiment of this application.
Figure 8:
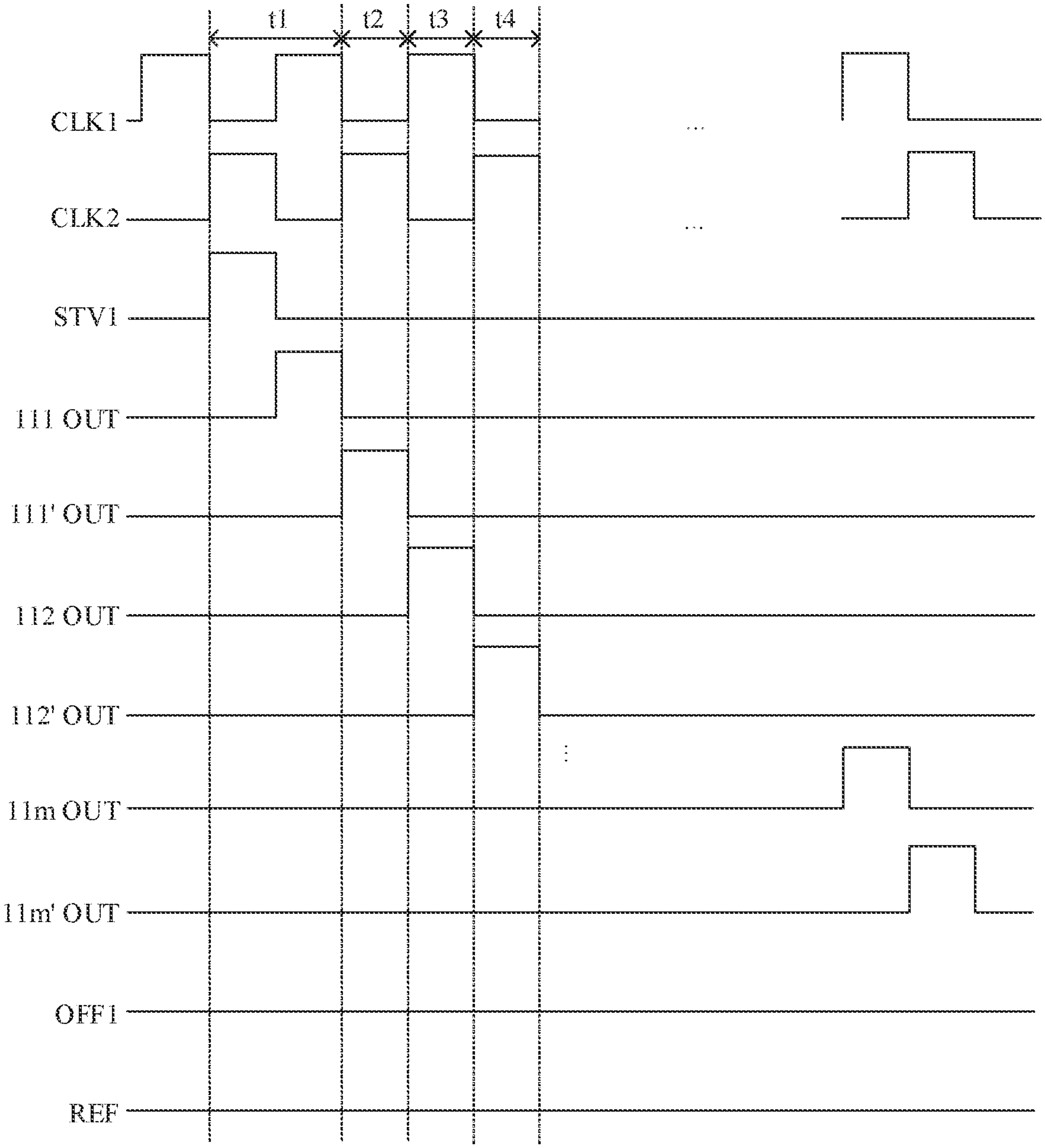
FIG. 8 is a sequence diagram of a signal line defect detection stage of the display apparatus shown in FIG. 7.

FIG. 7 is a partial enlarged view of another display apparatus according to an embodiment of this application, and FIG. 8 is a sequence diagram of a signal line defect detection stage of the display apparatus shown in FIG. 7. In an implementation, at least one repair line DUM may be reused as a detection line DET, and the repair line reused as the detection line may be used to transmit a signal on a first signal line DL to a drive chip 30 in a signal line defect detection stage; connection switches corresponding to the repair line DUM reused as the detection line DET are reused as a detection switch group, and a connection switch in the connection switch group reused as the detection switch group is reused as a detection switch. In the signal line defect detection stage, the detection switch is turned on, and a signal on the first signal line DL electrically connected to an output end of the detection switch is transmitted to the repair line DUM that is electrically connected to the output end of the detection switch and that is reused as the detection line DET, and then the signal on the first signal line DL is transmitted, by using the repair line DUM reused as the detection line DET, to the drive chip 30 for processing.

As shown in FIG. 7, the signal line repair module 10 further includes a plurality of reset switches 12' and a second reset signal line REF, and the second reset signal line REF obtains a reset signal from the drive chip 30 and transmits the reset signal to a repair line reused as a detection line. An input end of each reset switches 12' is electrically connected to at least one repair line DUM reused as a detection line DET, and an output end thereof is electrically connected to the second reset signal line REF. The second reset signal line REF receives and transmits the reset signal output by the drive chip 30, and when the reset switch 12' is turned on, a signal on the repair line DUM electrically connected to the input end of the reset switch 12' is reset. The reset switch 12' may be a transistor, the input end and the output end of the reset switch 12' are a source and a drain of the transistor, and a control end thereof is a gate of the transistor.

In an embodiment of this application, the signal line repair module 10 may not only repair the first signal line DL, but also detect a defect of the first signal line DL. That is, the signal line repair module 10 detects the defect of the first signal line DL in the signal line defect detection stage, and repairs the first signal line DL in the signal line repair stage. In addition, the signal line defect detection stage is performed before the signal line repair stage, so as to provide a position of the disconnected first signal line DL for the signal line repair stage.

In the signal line defect detection stage, after one first shift unit 11 is turned on, a corresponding connection switch 12 in the connection switch group reused as a detection switch group is turned on, and the connection switch 12 that is turned on electrically connects the first signal line DL that is electrically connected to the connection switch to a detection line DET, the detection line DET transmits a signal on the first signal line DL to a drive chip 3030 or a mainboard 003, and the drive chip 3030 or the mainboard 003 processes the signal to determine whether the first signal line DL is disconnected. For example, after receiving the signal, the drive chip 3030 or the mainboard compares a signal provided by the drive chip 3030 to the first signal line DL with the signal. If the two signals are different, it indicates that the first signal line DL is defective. Assuming that the signal transmitted by the detection line DET to the drive chip 3030 or the mainboard has zero potential, it may be determined that the first signal line DL is disconnected.

It should be noted that, in an embodiment of this application, as shown in FIG. 7, in the signal line defect detection stage, a plurality of stages of first shift units 11 are also sequentially turned on, so as to detect first signal lines DL sequentially. When different first signal lines DL are detected, a signal that is on the detection line DET and that is used to detect each first signal line DL should be consistent with a signal on the detected first signal line DL. Then, after each first signal line DL is detected, the signal that is on the detection line DET and that is used to detect a signal line defect may be reset. Therefore, one reset switch 12' may be disposed in a one-to-one correspondence with the first signal line DL, that is, a plurality of reset switches 12' and a plurality of connection switches 12 in a connection switch group reused as a detection switch group may be alternately disposed one by one. In the signal line defect detection stage, a plurality of reset switches 12' may be sequentially turned on, and one reset switch 12' may be turned on after a corresponding connection switch 12 is turned on and then turned off, that is, the reset switch is turned on after detection of the corresponding first signal line DL is completed.

In an embodiment of this application, as shown in FIG. 7, the signal line repair module 10 in this embodiment of this application further includes a plurality of reset shift units 11', and the plurality of reset shift units 11' are disposed in a one-to-one correspondence with reset switches and may sequentially output enable signals. A shift output end OUT of each reset shift unit 11' is electrically connected to a control end of a corresponding reset switch 12', and a signal output by the shift output end OUT thereof can control the reset switch 12' to be turned on or turned off. In this embodiment of this application, the shift output ends OUT of the reset shift units 11' in the signal line repair module 10 sequentially output enable signals, so that reset switches 12' electrically connected to a plurality of stages of reset shift units 11' respectively may be controlled to be sequentially turned on. When detection of one first signal line DL is completed, the reset switch 12' corresponding to the first signal line DL may be controlled by the reset shift unit 11' to be turned on, so that a signal that is on a repair line DUM and that is used to detect the first signal line DL may be reset, so as to ensure accuracy of the signal on the repair line DUM when the next first signal line DL is detected. The structure and operating principle of the reset shift unit 11' may be the same as those of the first shift unit 11. Details are not described herein again.

In an implementation of this application, as shown in FIG. 7, among the plurality of stages of reset shift units 11 and the plurality of stages of first shift units 11 included in the signal line repair module 10, the reset shift units 11' and the first shift units 11 are sequentially and alternately disposed and cascaded. A manner of cascading the reset shift units 11' and the first shift units 11 is the same as the manner of cascading the plurality of stages of first shift units 11 shown in FIG. 3. Details are not described herein again.

FIG. 8 is a sequence diagram of a signal line defect detection stage of a display panel shown in FIG. 7. The operation process of the signal line repair module 10 in the signal line defect detection stage in this application is described below with reference to FIG. 7 and FIG. 8. As shown in FIG. 7, the signal line repair module 10 includes m stages of first shift units 11 and m stages of reset shift units 11'. The m stages of reset shift units 11' are a first-stage reset shift unit 111', a second-stage reset shift unit 112', . . . , a $(n-1)^{th}$-stage reset shift unit 11$(n-1)$', an $n^{th}$-stage reset shift unit 11$n$', . . . , an $m^{th}$-stage reset shift unit 11$m$'. The specific operation process of the signal line repair module 10 in the line defect detection stage is as follows.

At a time t1, the turn-on signal input end IN of the first-stage first shift unit 111 receives an enable signal transmitted by the first start signal line STV1, then the first clock signal line CLK1 connected to the clock signal input end CLK of the first-stage first shift unit 111 transmits an active signal, then the shift output end OUT of the first-stage first shift unit 111 outputs the enable signal, the shift output end OUT of the first-stage first shift unit 111 controls the first connection switch 121 to be turned on, and then a signal on the first first signal line DL1 is transmitted to a detection line DET.

At a time t2, the turn-on signal input end IN of the first-stage reset shift unit 11' receives the active signal output by the shift output end OUT of the first-stage first shift unit 111, then the second clock signal line CLK2 connected to the clock signal input end CLK of the first-stage reset shift unit 11' transmits an active signal, then the shift output end OUT of the first-stage reset shift unit 111' outputs an enable signal to control the reset switch 12' electrically connected to the shift output end OUT of the first-stage reset shift unit 111' to be turned on, and a reset signal transmitted on the second reset signal line REF is transmitted to a detection line DET. In addition, the reset control signal input end RET of the first-stage first shift unit 111 receives the enable signal output by the shift output end OUT of the first-stage reset shift unit 111', then the reset signal transmitted on the first reset signal line OFF1 controls the first-stage first shift unit 111 to be turned off and the shift output end OUT of the first-stage first shift unit 111 is reset, the first connection switch 121 controlled by the shift output end OUT of the first-stage first shift unit 111 is turned off, and the first signal line DL1 is electrically disconnected from the detection line DET.

At a time 3, the turn-on signal input end IN of the second-stage first shift unit 112 receives the enable signal output by the shift output end OUT of the first-stage reset shift unit 111', then the first clock signal line CLK1 connected to the clock signal input end CLK of the second-stage first shift unit 112 transmits an active signal, then the shift output end OUT of the second-stage first shift unit 112 outputs an enable signal, the second connection switch 122 controlled by the shift output end OUT of the second-stage first shift unit 112 is turned on, and a signal on the second first signal line DL2 is transmitted to a detection line DET. In addition, the reset control signal input end RET of the first-stage reset shift unit 111' receives the enable signal output by the shift output end OUT of the second-stage first shift unit 112, then the reset signal transmitted on the first reset signal line OFF1 controls the first-stage reset shift unit 111' to be turned off and the shift output end OUT of the first-stage reset shift unit 111' is reset, the reset switch 12' electrically connected to the shift output end OUT of the first-stage reset shift unit 111' is turned off, and the detection line DET is disconnected from the second reset signal line REF.

At a time t4, the turn-on signal input end IN of the second-stage reset shift unit 112' receives the active signal output by the shift output end OUT of the second-stage first shift unit 112, then the second clock signal line CLK2 connected to the clock signal input end CLK of the second-stage reset shift unit 112' transmits an active signal, then the shift output end OUT of the second-stage reset shift unit 112' outputs an enable signal to control the reset switch 12' electrically connected to the shift output end OUT of the second-stage reset shift unit 112' to be turned on, and a reset signal transmitted on the second reset signal line REF is transmitted to a detection line DET. In addition, the reset control signal input end RET of the second-stage first shift unit 112 receives the enable signal output by the shift output end OUT of the second-stage reset shift unit 112', then the reset signal transmitted on the first reset signal line OFF1 controls the second-stage first shift unit 112 to be turned off and the shift output end OUT of the second-stage first shift unit 112 is reset, the second connection switch 122 controlled by the shift output end OUT of the second-stage first shift unit 112 is turned off, and the second signal line DL2 is electrically disconnected from the detection line DET.

By analogy, defect detection of all the first signal lines DL is completed.

Figure 9:
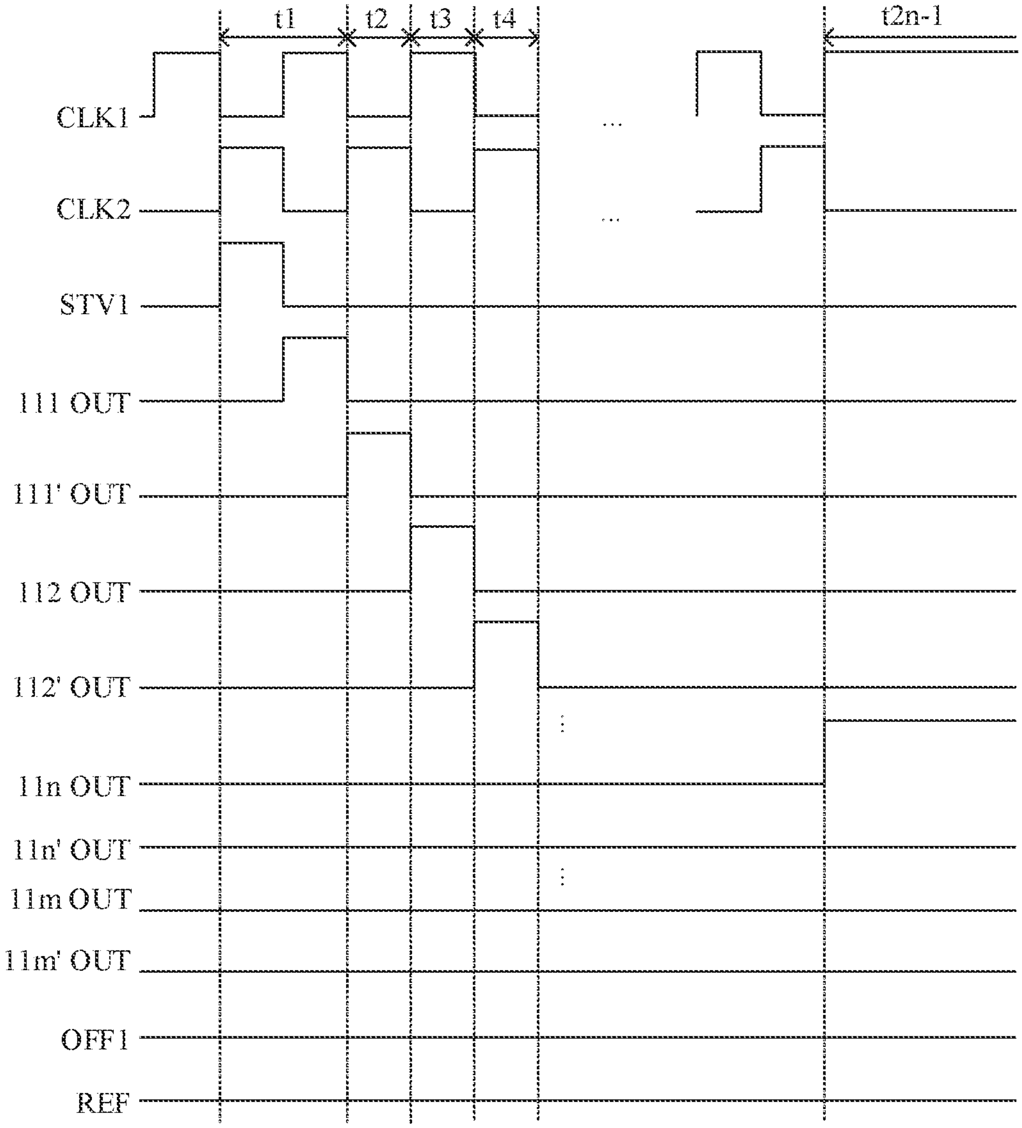
FIG. 9 is a sequence diagram of a signal line repair stage of the display apparatus shown in FIG. 7.

FIG. 9 is a sequence diagram of a signal line repair stage of the display apparatus shown in FIG. 7. Still assuming that the $n^{th}$ first signal line DLn is disconnected, the operation process of the signal line repair module 10 in the signal line repair stage in this application is described below with reference to FIG. 7 and FIG. 9.

The specific operation process of the signal line repair module 10 in the signal line repair stage is as shown in FIG. 9, which differs from the signal line detection stage shown in FIG. 8 in that at a time t(2n−1), the turn-on signal input end IN of the $n^{th}$-stage first shift unit 11*n* receives the enable signal output by the shift output end OUT of the $(n-1)^{th}$-stage first shift unit 111', then a clock signal line connected to the clock signal input end CLK of the $n^{th}$-stage first shift unit 11*n*, for example, the first clock signal line CLK1, transmits an active signal, then the shift output end OUT of the $n^{th}$-stage first shift unit 11*n* outputs the enable signal, the $n^{th}$ connection switch 12*n* that is in one connection switch group and that is controlled by the shift output end OUT of the $n^{th}$-stage first shift unit 11*n* is turned on, and then the $n^{th}$ first signal line DLn is electrically connected to one repair line DUM. At this time, a clock signal line connected to the clock signal input end CLK of the $n^{th}$-stage first shift unit 11*n*, for example, the first clock signal line CLK1, keeps transmitting active signals in the signal line repair stage and the display stage, while other clock signal lines continuously output inactive signals, and then the shift output end OUT of the $n^{th}$-stage first shift unit 11*n* continuously outputs enable signals, while other first shift units 11 are continuously turned off. Then, the $n^{th}$ first signal line DLn is continuously electrically connected to one repair line DUM, and repair of the $n^{th}$ first signal line DLn is completed.

In an embodiment of this application, as shown in FIG. 3 and FIG. 7, the signal line repair module 10 includes a connection switch group and a repair line DUM, so that the shift output end OUT of the first shift unit 11 is electrically connected to a control end of the connection switch 12, and when the shift output end OUT of the first shift unit 11 outputs an enable signal, the connection switch 12 is controlled to be turned on.

Figure 10:
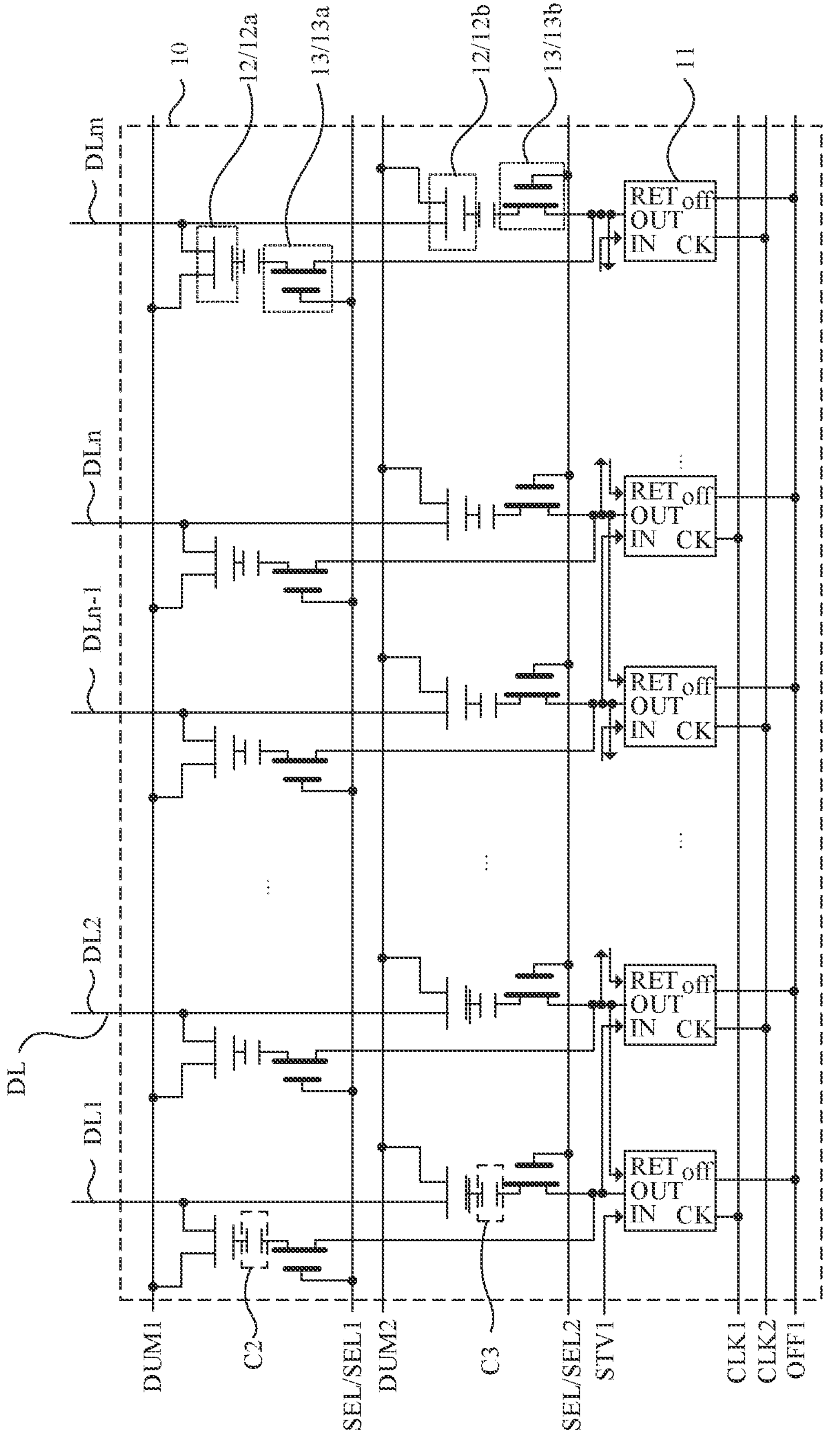
FIG. 10 is a partial enlarged view of still another display apparatus according to an embodiment of this application.

FIG. 10 is a partial enlarged view of a further display apparatus according to an embodiment of this application. As shown in FIG. 10, in an embodiment of this application, the signal line repair module 10 includes a plurality of connection switch groups and a plurality of repair lines DUM, and the plurality of connection switch groups and the plurality of repair lines DUM are in a one-to-one correspondence. Each connection switch group includes a plurality of connection switches 12, input ends of the plurality of connection switches 12 in the same connection switch group are electrically connected to different first signal lines DL respectively, output ends of the plurality of connection switches 12 in the same connection switch group are electrically connected to a corresponding repair line DUM, and connection switches 12 in different connection switch groups are electrically connected to different repair lines DUM.

When the signal line repair module includes the plurality of connection switch groups and the plurality of repair lines DUM, the signal line repair module 10 further includes selector switch groups, selection signal lines SEL, and a plurality of storage capacitor groups which are all in a one-to-one correspondence with the connection switch groups.

The plurality of selection signal lines SEL are disposed in a one-to-one correspondence with the plurality of selector switch groups, and the selection signal lines SEL are electrically connected to control ends of the plurality of selector switches 13 in the corresponding selector switch groups.

Each storage capacitor group includes a plurality of storage capacitors C3, the plurality of storage capacitors C3 in each storage capacitor group are in a one-to-one correspondence with the plurality of connection switches 12 in the corresponding connection switch group, and first polar plates of the storage capacitors C3 are electrically connected to control ends of the corresponding connection switches 12.

Each selector switch group includes a plurality of selector switches 13, the plurality of selector switches 13 in each selector switch group are in a one-to-one correspondence with the plurality of storage capacitors C3 in the corresponding storage capacitor group. Among the corresponding selector switch group and selector switch group, output ends of selector switches 13 are electrically connected to second polar plates of corresponding storage capacitors C3, input ends of the selector switches 13 are electrically connected to shift output ends OUT of corresponding first shift units 11, control ends of the selector switches 13 are electrically connected to corresponding selection signal lines SEL, and control ends of selector switches 13 in different selector switch groups are electrically connected to different selection signal lines SEL. When a selector switch 13 is turned on, an enable signal output by the shift output end OUT of the first shift unit 11 electrically connected to the selector switch 13 is transmitted, by using the selector switch 13, to a control end of the connection switch 12 electrically connected to the selector switch 13. Then, in an implementation of this application, the selector switch 13 may be a transistor, a source of the transistor is used as an input end thereof, a drain thereof is used as an output end thereof, and a gate thereof is used as a control end thereof.

That the drive chip 30 sends a control signal to the signal line repair module 10 includes that a selection signal is sent to the selection signal line SEL, so that the selector switch 13 electrically connected to the selection signal line SEL transmitting the selection signal is turned on, and an enable signal output by the first shift unit 11 is transmitted to a control end of a corresponding connection switch 12, so that the corresponding connection switch 12 is turned on. When a plurality of first signal lines are disconnected, and a first shift unit 11 corresponding to a disconnected first signal line DL outputs an enable signal, a corresponding selector switch in one selector switch group is turned on, then the enable signal may control a corresponding connection switch in a connection switch group to be turned on, and the disconnected first signal line DL may be electrically connected to one repair line DUM; when a first shift unit 11 corresponding to another disconnected first signal line DL outputs an enable signal, a corresponding selector switch in another selector switch group is turned on, and then the enable signal may control a corresponding connection switch in another connection switch group to be turned on, so that the disconnected first signal line DL may be electrically connected to another repair line DUM.

Specifically, assuming that a plurality of first signal lines DL are disconnected, shift output ends OUT of a plurality of stages of first shift units 11 sequentially output enable signals. When the first shift unit 11 of one stage corresponding to a disconnected first signal line DL outputs an enable signal, a selector switch 13 in one selector switch group is turned on, and the enable signal output by the first shift unit 11 of this stage is transmitted to a storage capacitor, so that potential of a gate of a connection switch 12 is raised or lowered, and then the connection switch 12 is controlled to be turned on. Repair of one first signal line DL may be completed based on the foregoing method of repairing a first signal line DL. After the repair of one first signal line DL is completed, the selector switch 13 that is turned on is turned off, but the connection switch 12 that is turned on is still turned on due to the existence of the storage capacitor. Then, by using the foregoing method, the selector switch 13 in another selector switch group is turned on, and then repair of another first signal line DL may be implemented. Through arrangement of a plurality of connection switch groups, a plurality of repair lines, a plurality of selector switch groups, and a plurality of storage capacitor groups, a plurality of disconnected first signal lines DL may be electrically connected to a plurality of repair lines DUM one by one, thereby implementing repair of the plurality of first signal lines DL.

FIG. 10 is a partial enlarged view of a further display apparatus according to an embodiment of this application. Repair of a plurality of first signal lines DL is described below with reference to FIG. 10. It should be noted that, in FIG. 10, that a signal line repair module 10 may repair only two first signal lines DL is used for description. According to the inventive concept of this application, if selector switch groups, connection switch groups, and repair lines in the signal line repair module 10 are different in quantity, different quantities of first signal lines DL may be repaired. The quantities of selector switch groups, connection switch groups, and repair lines may be the same and may be the same as that of repairable first signal lines DL.

As shown in FIG. 10, the signal line repair module 10 includes two selector switch groups, a plurality of selector switches included in one selector switch group are first-type selector switches 13*a*, and a plurality of selector switches included in the other selector switch group are second-type selector switches 13*b*. The signal line repair module 10 includes two connection switch groups, a plurality of connection switches included in one connection switch group are first-type connection switches 12*a*, and a plurality of connection switches included in the other selector switch group are second-type connection switches 12*b*. The signal line repair module 10 includes two repair lines DUM: first repair lines DUM1 and DUM2. The signal line repair module 10 includes two selection signal lines SEL: a first selection signal line SEL1 and a second selection signal line SEL2. The signal line repair module 10 includes two storage capacitor groups, a plurality of storage capacitors included in one storage capacitor group are first-type storage capacitors C2, and a plurality of storage capacitors included in the other storage capacitor group are second-type storage capacitors C3. Control ends of the first-type selector switches 13*a* are electrically connected to the first-type selection signal line SEL1, and control ends of the second-type selector switches 13*b* are electrically connected to the second selection signal line SEL2. Output ends of the first-type connection switches 12*a* are electrically connected to the first repair line DUM1, and output ends of the second-type connection switches 12*b* are electrically connected to the second repair line DUM2. One first signal line DL is electrically connected to an input end of one first-type connection switch 12*a* and electrically connected to an input end of one second-type connection switch 12*b*. An input end of the first-type selector switch 13*a* corresponding to the first-type connection switch 12*a* electrically connected to a same first signal line DL and an input end of the second-type selector switch 13*b* corresponding to the second-type connection switch 12*b* electrically connected to the same first signal line DL are electrically connected to a shift output end of a same shift unit 11.

Assuming that both the $n^{th}$ first signal line DLn and the (n−1)th first signal line DL(n−1) are disconnected, one of the first signal lines DL is repaired first, and then the other first signal line DL is repaired.

For example, the $n^{th}$ first signal line DLn is repaired first. When the $n^{th}$-stage first shift unit 11 outputs an enable signal, one selection signal line SEL transmits the enable signal, and all the selector switches 13 in one selector switch group are turned on. For example, the first selection signal line SEL1 transmits the enable signal to turn on all the first-type selector switches 13*a*, then first polar plates of all first-type storage capacitors C2 in one corresponding storage capacitor group are electrically connected to the shift output end OUT of the first shift unit 11, that is, the $n^{th}$ first signal line DLn is electrically connected to the first repair line DUM1, then the enable signal output by the $n^{th}$-stage first shift unit 11 is transmitted to the corresponding first-type storage capacitor C2 to complete repair of the $n^{th}$ first signal line DLn, and then the first selection signal line SEL1 transmits a turn-off signal to turn off all the first selector switches 13*a*. However, due to existence of the first-type storage capacitors C2, the first-type connection switch 12*a* corresponding to the $n^{th}$ first signal line DLn is still turned on and keeps repairing the $n^{th}$ first signal line DLn.

Then the (n−1)th first signal line DL(n−1) is repaired. When the $(n-1)^{th}$-stage first shift unit outputs an enable signal, another selection signal line SEL transmits the enable signal, then all selector switches 13 in another selector switch group are turned on. If the second selection signal line SEL2 transmits the enable signal, so that all the second-type selector switches 13*b* are turned on, first polar plates of all second-type storage capacitors C3 in another corresponding storage capacitor group are electrically connected to the shift output end OUT of the first shift unit 11. Based on the same principle in which the $n^{th}$ first signal line DLn is electrically connected to the first repair line DUM1, the $(n-1)^{th}$ first signal line DL(n−1) is electrically connected to the second repair line DUM2, to complete repair of the $(n-1)^{th}$ first signal line DL(n−1), and then the second selection signal line SEL2 transmits a turn-off signal to turn off all the second-type selector switches 13*b*, but repair of the $(n-1)^{th}$ first signal line DL(n−1) is kept.

It should be noted that, when the signal line repair module 10 includes a plurality of selector switch groups, a plurality of selection signal lines SEL, and a plurality of storage capacitor groups, in a process of repairing the $n^{th}$ first signal line DLn, a time when the selection signal line SEL transmits a signal to turn on the selector switch 13 may be at the same time or slightly later than a time when the $n^{th}$ first shift unit 11 outputs the enable signal, so as to avoid erroneous repair of another first signal line DL.

Figure 11:
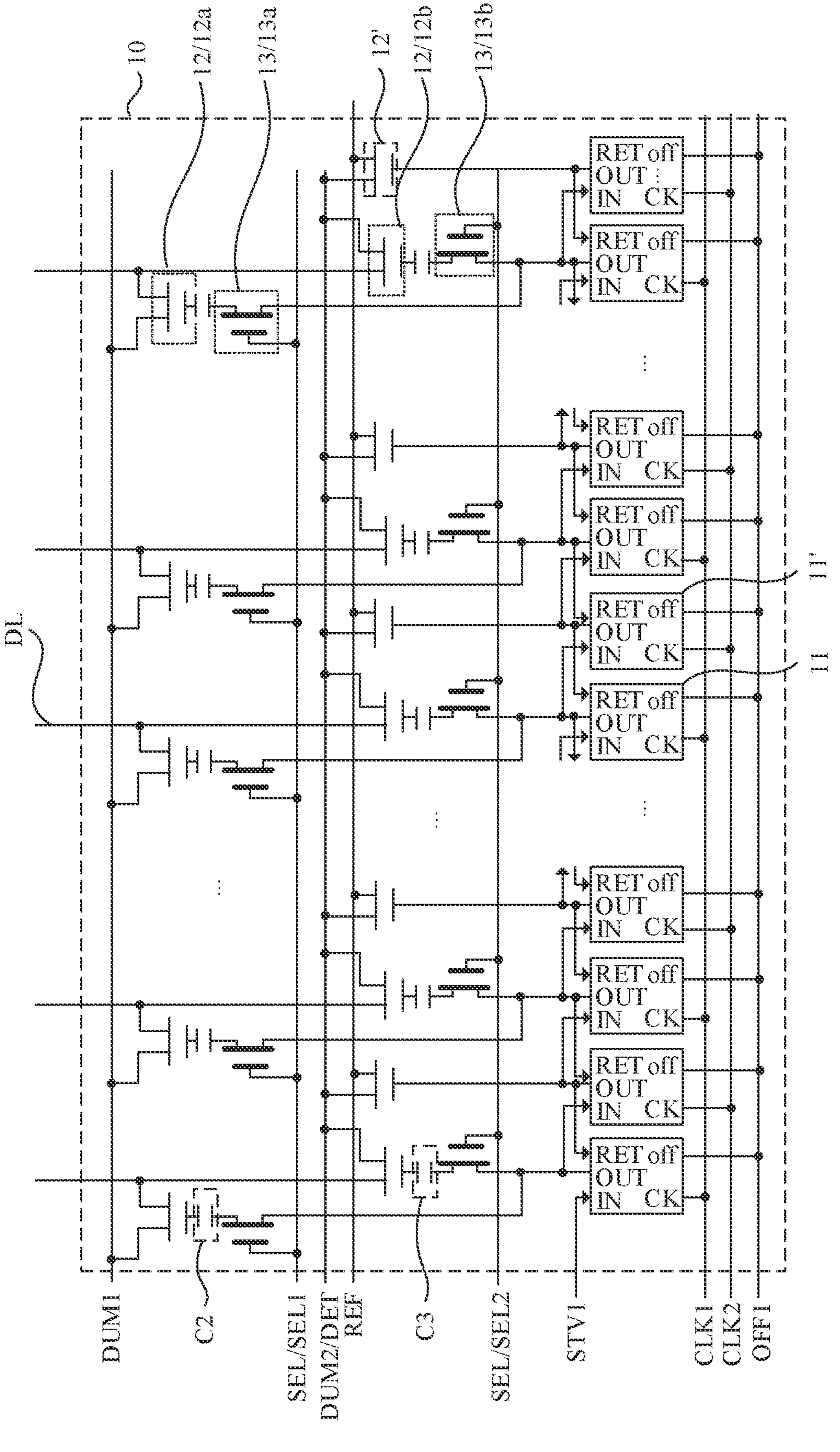
FIG. 11 is a partial enlarged view of yet another display apparatus according to an embodiment of this application.

FIG. 11 is a partial enlarged view of yet another display apparatus according to an embodiment of this application. The display apparatus shown in FIG. 11 differs from the display apparatus shown in FIG. 10 in that the signal line repair module 10 further includes a plurality of stages of reset shift units 11' and a plurality of reset switches 12', and one repair line DUM is reused as a detection line DET, that is, the signal line repair module 10 shown in FIG. 11 may reset a plurality of first signal lines DL and may detect a signal line defect.

A manner of cascading the reset shift units 11' and the first shift units 11 shown in FIG. 11 is the same as that of the embodiment shown in FIG. 7, and a manner of connection between the reset switch 12' and the reset shift unit 11' and connection between the reset switch 12' and the second reset signal line REF is also the same as that of the embodiment shown in FIG. 7. It should be noted that, when the signal line repair module 10 shown in FIG. 11 detects a defect of a first signal line DL, a selector switch 13 corresponding to a connection switch 12 corresponding to a repair line DUM reused as a detection line DET needs to be turned on, so as to ensure that a signal output by a shift output end OUT of a first shift unit 11 may control the connection switch 12 corresponding to the repair line DUM reused as the detection line DET to be turned on. The following signal line defect detection process is the same as the detection process of the embodiment shown in FIG. 7. As shown in FIG. 11, assuming that a second repair line DUM2 is reused as a detection line DET, in the signal line defect detection stage, second-type selector switches 13*b* are turned on first, so that an enable signal output by a shift output end OUT of a first shift unit 11 may be transmitted to second-type storage capacitors C2, and control second-type connection switches 12*b*.

The signal line repair module 10 shown in FIG. 11 has the basic process in the signal line repair stage as the signal line repair module 10 shown in FIG. 10, except that the repair line DUM reused as the detection line DET starts to repair a first signal line DL after another repair line DUM completes repairing of the first signal line DL, that is, the repair line DUM reused as the detection line DET is a last choice to repairing the first signal line DL. That is, in the signal line repair stage, a time for electrical connection between the repair line DUM reused as the detection line DET and a disconnected signal line DL and repair of the disconnected signal line DL is later than a time for electrical connection between another repair line DUM and the disconnected signal line DL and repair of the disconnected signal line DL. In this embodiment of this application, a plurality of first signal lines DL may be sequentially repaired in a period of time. However, when a plurality of first signal lines DL are not disconnected simultaneously, defect detection needs to be performed on different first signal lines DL in different periods of time and a newly disconnected first signal line DL that is detected is repaired. Therefore, the repair line DUM reused as the detection line DET is the last to repair the first signal line DL, which can ensure that defect detection is performed on the first signal line DL before another repair line repairs the first signal line DL in different periods of time.

As shown in FIG. 11, when the second repair line DUM2 is reused as the detection line DET, and a first signal line DL is repaired, the first-type selector switch 13*a*, the first-type connection switch 12*a*, the first selection signal line SEL1, and the first repair line DUM1 are first used to repair the first signal line DL; and finally the second-type selector switch 13*b*, the second-type connection switch 12*b*, the second selection signal line SEL2, and the second repair line DUM2 are used to repair the first signal line DL.

Figure 12:
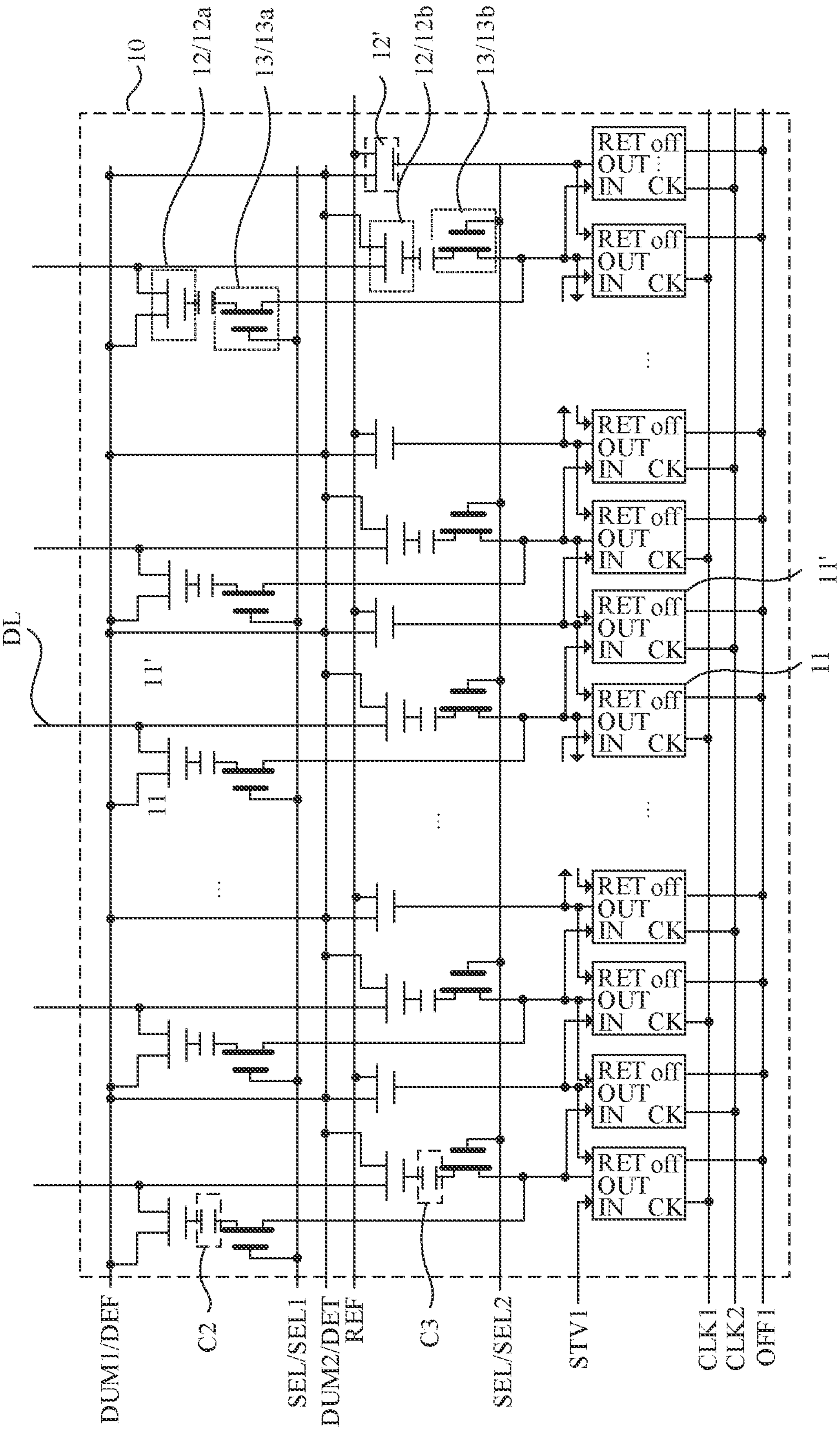
FIG. 12 is a partial enlarged view of still yet another display apparatus according to an embodiment of this application.

FIG. 12 is a partial enlarged view of still yet another display apparatus according to an embodiment of this application. A display panel shown in FIG. 12 differs from a display panel shown in FIG. 11 in that all repair lines DUM are reused as detection lines DET, then one detection line DET may be used to determine a disconnection condition of first signal lines DL once, and the repair line DUM reused as this detection line DET is used to repair one disconnected first signal line DL, and then another detection line DET is used to determine a disconnection condition of a first signal line DL once and the repair line DUM reused as this detection line DET is used to repair another disconnected first signal line DL. By analogy, all the repair lines DUM are used to repair the first signal lines DL.

As shown in FIG. 12, a first repair line DUM1 is reused as a detection line DET, and a second repair line DUM2 is also reused as a detection line DET. Then the detection line DET that reuse the first repair line DUM1, the first selection signal line SEL1, the first-type selector switches 13*a*, the first-type storage capacitors C2, and the first-type connection switches 12*a* may be first used to detect all first signal lines DL and repair one first signal line DL that is confirmed as being disconnected; then the detection line DET that reuses the second repair line DUM2, the second selection signal line SEL2, the second-type selector switches 13*b*, the second-type storage capacitors C3, and the second-type connection switches 12*b* are used to detect all the first signal lines DL and repair another first signal line DL that is confirmed as being disconnected.

It should be noted that when all the repair lines DUM are reused as the detection lines DET, the reset switches 12' and the reset shift units 11' are still disposed in a one-to-one correspondence, and the reset shift units 11' and the first shift units 11 are alternately disposed one by one, and then an output end of one reset switch 12' may be electrically connected to a plurality of repair lines reused as the detection lines DET.

Figure 13:
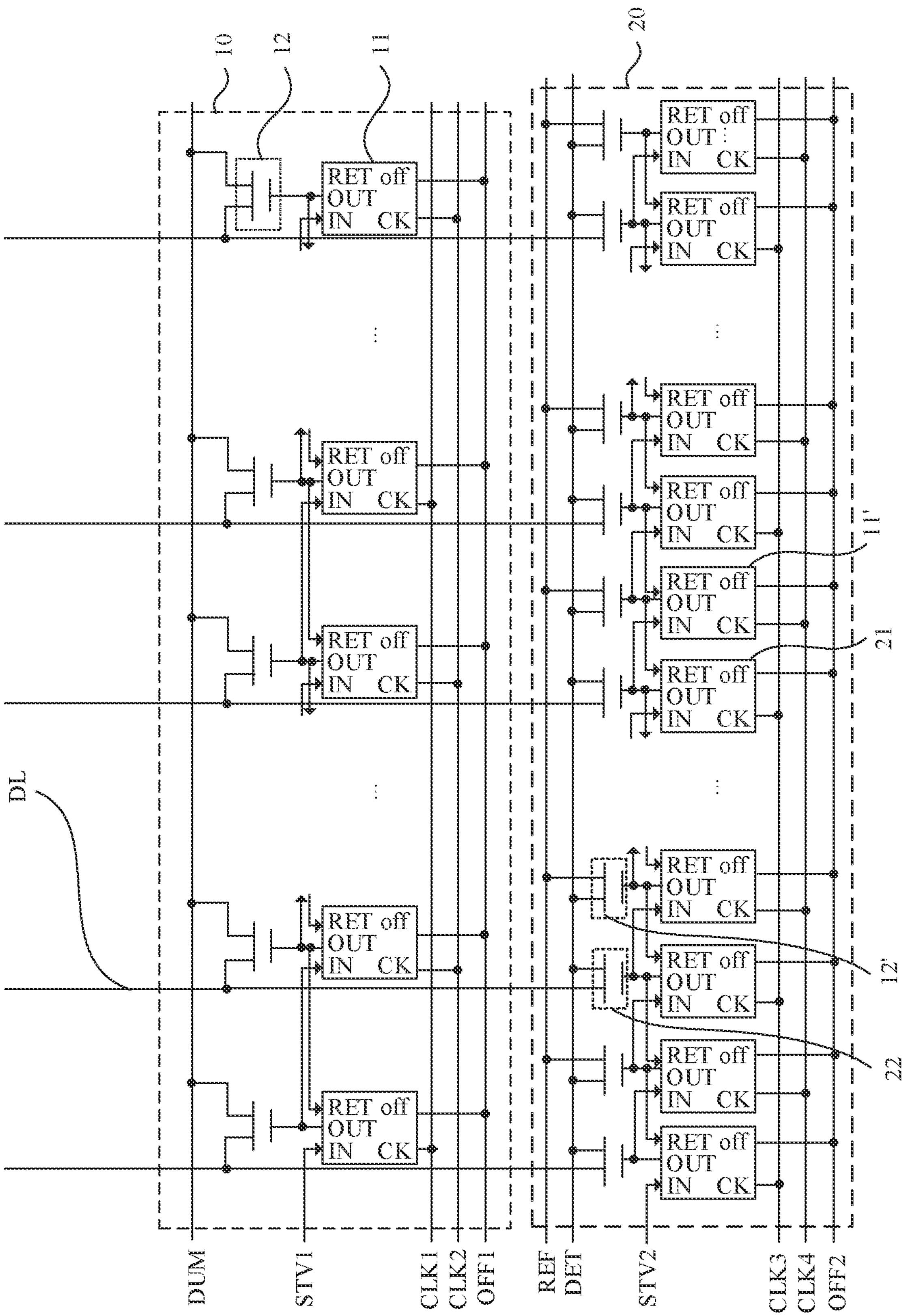
FIG. 13 is a partial enlarged view of still another display apparatus according to an embodiment of this application.

FIG. 13 is a partial enlarged view of a further display apparatus according to an embodiment of this application. As shown in FIG. 13, a non-display area BB of a display panel 001 of the display apparatus is further provided with a signal line defect detection module 20, and the signal line defect detection module 20 is electrically connected to a first signal line DL and configured to detect a defect of the first signal line DL.

The signal line defect detection module 20 includes a detection line DET, a second reset signal line REF, a plurality of detection switches 22, a plurality of reset switches 12', a plurality of second shift units 21, and a plurality of reset shift units 11'. The embodiment shown in FIG. 13 differs from the embodiments shown in FIG. 7, FIG. 11, and FIG. 12 in that the structure for signal line defect detection is a signal line defect detection module 20 independent of a signal line repair module 10.

The detection line DET is used to receive signals on first signal lines DL and transmit the signals to a drive chip 30. The drive chip 30 determines whether the signal on a first signal line DL is consistent with a reference signal. If a result is that the signals are inconsistent, it is determined that the first signal line DL is defective. If no signal exists on a first signal line DL, it is determined that the first signal line DL is disconnected.

The second reset signal line REF is used to obtain a reset signal from the drive chip 30 and transmit the reset signal to the detection line DET to reset the signal on the detection line DET.

A plurality of detection switches 22 are disposed in a one-to-one correspondence with a plurality of first signal lines DL, an input end of each detection switch 22 is electrically connected to one first signal line DL, and an output end thereof is electrically connected to the detection line DET. When the detection switch 22 is turned on, the signal on the first signal line DL electrically connected to the input end of the detection switch may be transmitted to the detection line DET electrically connected to the output end of the detection switch, then the signal on the first signal line DL may be transmitted to a drive chip 3030 or a mainboard 003 by using the detection line DET, and the signal is processed to determine whether the first signal line DL is defective.

An output end of each reset switch 12' is electrically connected to the detection line DET, and an input end thereof is electrically connected to the second reset signal line REF. When the reset switch 12' is turned on, a reset signal transmitted on the reset line REF electrically connected to the input end of the reset switch is transmitted to the detection line DET, and the signal on the detection line DET may be reset.

The detection switches 22 are disposed in a one-to-one correspondence with the second shift units 21, shift output ends OUT of the second shift units 21 are electrically connected to control ends of the detection switches 22, the reset switches 12' are disposed in a one-to-one correspondence with the reset shift units 11', shift output ends OUT of the reset shift units 11' are electrically connected to control ends of the reset switches 12', and the signal output by the shift output end OUT of each second shift unit 21 and the shift output end OUT of each reset shift unit 11' are respectively used to control the detection switch 22 and the reset switch 12' electrically connected to the shift output ends OUT to be turned on or turned off. The detection switch 22 may be a transistor, a source of the detection switch 22 is a source of the transistor, a drain thereof is a drain of the transistor, and a gate thereof is a control end of the transistor.

Because after one detection switch 22 is turned on, a signal on the detection line DET is a signal on a first signal line DL electrically connected to the detection switch 22, to ensure detection accuracy of the next first signal line DL, the signal on the detection line DET needs to be reset. Therefore, the reset switches 12' and the detection switches 22 may be alternately disposed one by one, and the reset switches 11' are turned on after the corresponding detection switches 22 are turned on and then turned off.

In this embodiment, the second shift unit 21 may have the same structure and operating principle as the first shift unit 11.

As shown in FIG. 13, reset signal input ends off of the second shift units 21 included in the signal line defect detection module 200 may be all electrically connected to a same reset signal line, and the reset signal line may continuously transmit reset signals in a signal line repair stage. For example, the reset signal input ends are electrically connected to a second reset signal line OFF2, and the second reset signal line OFF2 continuously outputs reset signals in the signal line repair stage.

To detect the first signal lines DL sequentially, signals on the first signal lines DL should be sequentially transmitted to the drive chip 3030 or a mainboard 004 by using the detection line DET, and then the second shift units 21 should be sequentially turned on, so that the corresponding detection switches 22 are sequentially turned on. Correspondingly, the reset shift units 11' should also be sequentially turned on, so that the corresponding reset switches 12' are sequentially turned on.

In an embodiment of this application, the second shift units 21 and the reset shift units 11' are sequentially and alternately disposed and cascaded, that is, a manner of cascading the second shift units 21 and the reset shift units 11' may be the same as the manner of cascading the first shift unit 11 and the reset shift unit 11' in the embodiments shown in FIG. 7, FIG. 11, and FIG. 12. The first shift units 11 are cascaded in the same manner. A turn-on signal input end IN of a first-stage second shift unit 21 is electrically connected to a start signal line, for example, a second start signal line STV2, and the second start signal line STV2 provides an enable signal to the turn-on signal input end IN of the first-stage second shift unit 21. Clock signal input ends CLK of adjacent second shift units 21 and reset shift units 11' among the cascaded second shift units 21 and reset shift units 11' are connected to different clock signal lines. As shown in FIG. 13, clock signal input ends CLK of the second shift units 21 and the reset shift units 11' are alternately electrically connected to a third clock signal line CLK3 and a fourth clock signal line CLK4, and the third clock signal line CLK3 and the fourth clock signal line CLK4 output pulse signals alternately, so that the cascaded second shift units 21 and reset shift units 11' may sequentially output enable signals in cooperation with a signal received by the turn-on signal input end IN. Then, after one second shift unit 21 outputs an enable signal, detection of one first signal line DL is completed; then the second shift unit 21 is turned off and the reset shift unit 11' cascaded with and adjacent to the second shift unit 21 outputs an enable signal to complete resetting of the detection line DET, and the second shift unit 21 of the previous stage is turned off; the second shift unit 21 of the next stage outputs an enable signal to complete detection of another first signal line DL; . . . ; and this operation is repeated until detection of all the first signal lines DL is completed.

In another embodiment of this application, the second shift units 21 are sequentially cascaded and the reset shift units 11' are sequentially cascaded. Then, after one second shift unit 21 outputs an enable signal, detection of one first signal line DL is completed; then the second shift unit 21 of this stage is turned off and the reset shift unit 11' outputs an enable signal to complete resetting of the detection line DET; then the second shift unit 21 cascaded with and adjacent to the previous second shift unit 21 outputs an enable signal to complete detection of one first signal line DL; . . . ; and this operation is repeated until detection of all the first signal lines DL is completed.

In this embodiment of this application, defect detection of the first signal lines DL does not require detection software or a detection device such as a microscope, which can reduce detection costs and improve detection efficiency.

An operating stage of a display apparatus further includes a signal line defect detection stage. In the signal line defect detection stage, the signal line defect detection module 20 operates and locates a defective first signal line DL. When a first signal line DL with a disconnection defect is detected, the signal line repair module 10 may be started. The operation process in which the signal line repair module 10 repairs a first signal line DL is the same as that of any of the foregoing embodiments, and repair of the disconnected first signal line DL is completed.

Figure 14:
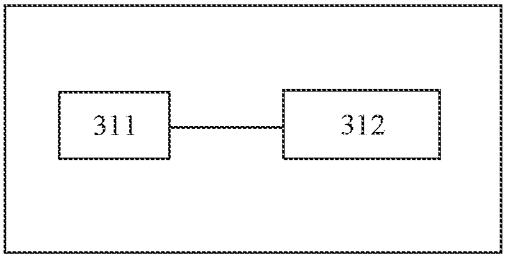
FIG. 14 is a schematic diagram of a structure of a drive chip according to an embodiment of this application.

An embodiment of this application further provide a drive chip, which can be configured to control signal line repair of a display panel according to an embodiment of this application. FIG. 14 is a schematic diagram of a structure of a drive chip according to an embodiment of this application. As shown in FIG. 14, the drive chip includes a control unit 311 and an input/output unit 312.

When determining that a disconnected first signal line exists, the drive chip provides a control signal, so that the disconnected first signal line DL is electrically connected to a repair line DUM in the signal line repair module 10. Providing a control signal, so that the disconnected first signal line is electrically connected to a repair line DUM in the signal line repair module 10 includes: The control unit 311 instructs the input/output unit 312 to send a control signal to a plurality of stages of first shift units 11 of the signal line repair module 10, to control the shift output end of the first shift unit 11 corresponding to the disconnected first signal line DL to output an enable signal, so that a corresponding connection switch in a connection switch group is controlled to be turned on, to enable the disconnected signal line DL to be electrically connected to one repair line DUM. For example, an enable signal is provided to a start signal line, a reset signal is provided to a reset signal line, pulse signals are provided to a clock signal line, and enable signals or disable signals are continuously output after a plurality of pulse signals are output to the clock signal line.

When the signal line repair module 10 includes a plurality of repair lines, a plurality of connection switch groups, a plurality of storage capacitor groups, a plurality of selector switch groups, and a plurality of selection signal lines that are all in a one-to-one correspondence, and a chip determines that a disconnected first signal line DL exists, the control unit 311 is further configured to instruct the input/output unit 312 to output selection signals to the plurality of selection signal lines respectively, to start the selector switch groups respectively so as to start the connection switch groups respectively, thereby controlling a plurality of disconnected first signal lines DL to be electrically connected to different repair lines DUM respectively.

The drive chip further provides a signal to a plurality of first signal lines DL to control sub-pixels P0 to perform light-emitting display.

Referring to the foregoing illustration of FIG. 1 or FIG. 2, the drive chip in FIG. 1 or FIG. 2 is the drive chip 30 according to this embodiment of FIG. 14 of this application.

Figure 15:
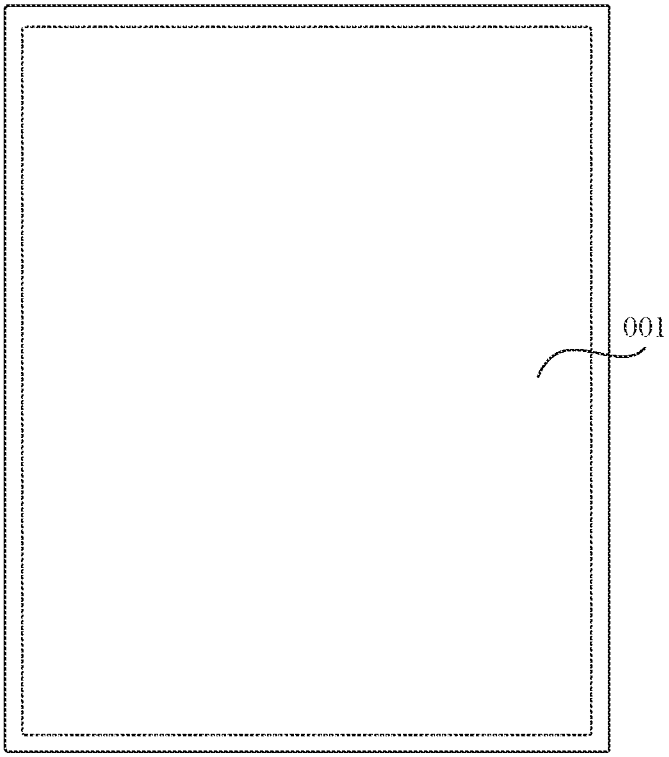
FIG. 15 is a schematic diagram of an electronic device according to an embodiment of this application.

This application further provides an electronic device. FIG. 15 is a schematic diagram of an electronic device according to an embodiment of this application. As shown in FIG. 15, the electronic device includes the display apparatus according to any one of the embodiments of this application. The specific structure of the display apparatus has been described in detail in the foregoing embodiments. Details are not described herein again. Certainly, the electronic device shown in FIG. 15 is provided only for schematic illustration, and may be, for example, any electronic device with a display function, such as a mobile phone, a tablet computer, a notebook computer, an E-book reader, a TV, or a smartwatch.

The foregoing descriptions are merely specific implementations of this application. Any person skilled in the art can easily conceive modifications or replacements within the technical scope of this application, and these modifications or replacements shall fall within the protection scope of this application. The protection scope of this application shall be subject to the protection scope of the claims.

What is claimed is:

1. A display apparatus, comprising:

a plurality of sub-pixels, wherein the sub-pixels are used for light-emitting display;

a plurality of signal lines, wherein the plurality of signal lines are electrically connected to the sub-pixels and provide a signal required for light-emitting display to the sub-pixels;

a signal line repair module, wherein the signal line repair module is electrically connected to the plurality of signal lines, and configured to repair a disconnected signal line; and the signal line repair module comprises:

at least one repair line;

at least one connection switch group, wherein the at least one connection switch group is disposed in a one-to-one correspondence with the at least one repair line; the connection switch group comprises a plurality of connection switches, the plurality of connection switches in a same connection switch group are disposed in a one-to-one correspondence with the plurality of signal lines, input ends of the connection switches are electrically connected to corresponding signal lines in the plurality of signal lines, and output ends thereof are each electrically connected to a corresponding repair line in the at least one repair line; and a first shift unit group, wherein the first shift unit group comprises a plurality of stages of first shift units, and the plurality of connection switches in each connection switch group are disposed in a one-to-one correspondence with the plurality of stages of first shift units; each first shift unit comprises a shift output end, and the shift output end of the first shift unit is electrically connected to a control end of a corresponding connection switch; and a drive chip, wherein the drive chip is electrically connected to the plurality of signal lines and the signal line repair module, and is configured to provide the signal required for controlling the light-emitting display of the sub-pixels to the signal lines, and send, when determining that a disconnected signal line exists, a control signal to the signal line repair module, to enable the disconnected signal line to be electrically connected to the at least one repair line in the signal line repair module; and sending the control signal to the signal line repair module, to enable the disconnected signal line to be electrically connected to the at least one repair line in the signal line repair module comprises: sending the control signal to the signal line repair module, so that the shift output end of the first shift unit corresponding to the disconnected signal line outputs an enable signal, so as to control a corresponding connection switch in a connection switch group to be turned on, to enable the disconnected signal line to be electrically connected to the at least one repair line.

2. The display apparatus according to claim 1, wherein the plurality of stages of first shift units in the first shift unit group are sequentially cascaded.

3. The display apparatus according to claim 1, wherein one or more repair lines of the at least one repair line are reused as a detection line, and the one or more repair lines reused as the detection line is configured to transmit a signal on a signal line to the drive chip;

the connection switch group corresponding to the one or more repair lines reused as the detection line is reused as a detection switch group, and the connection switches in the connection switch group reused as the detection switch group are reused as detection switches, and when the detection switches are turned on, the signal on the signal line electrically connected to an output end of each detection switch is transmitted to the corresponding repair line that is electrically connected to the output end and reused as the detection line; and the signal line repair module further comprises:

a second reset signal line, configured to obtain a reset signal from the drive chip and transmit the reset signal to the one or more repair lines reused as the detection line; and reset switches, wherein an input end of each reset switch is electrically connected to the one or more repair line reused as the detection line, an output end thereof is electrically connected to the second reset signal line, and when the reset switch is turned on, the reset signal transmitted on the reset line electrically connected to the input end of the reset switch is transmitted to the one or more repair lines reused as the detection line.

4. The display apparatus according to claim 3, wherein a plurality of reset switches and a plurality of connection switches in a connection switch group reused as the detection switch group are alternately disposed one to one.

5. The display apparatus according to claim 4, wherein the signal line repair module further comprises a plurality of reset shift units that are disposed in a one-to-one correspondence with the reset switches, and shift output ends of the reset shift units are electrically connected to control ends of corresponding reset switches; a signal output by the shift output ends of the reset shift units controls the reset switches to be turned on or turned off; and the reset shift units and the first shift units are disposed in a one-to-one correspondence and cascaded.

6. The display apparatus according to claim 1, wherein the signal line repair module comprises:

a plurality of repair lines;

a plurality of connection switch groups, wherein output ends of connection switches in different connection switch groups are electrically connected to different one of the plurality of repair lines respectively;

a plurality of storage capacitor groups, wherein the plurality of storage capacitor groups are disposed in a one-to-one correspondence with the plurality of connection switch groups; each storage capacitor group comprises a plurality of storage capacitors, the plurality of storage capacitors in each storage capacitor group are in a one-to-one correspondence with the plurality of connection switches in the corresponding connection switch group, and first polar plates of the storage capacitors are electrically connected to control ends of the corresponding connection switches;

a plurality of selector switch groups, wherein the plurality of selector switch groups are disposed in a one-to-one correspondence with the plurality of storage capacitor groups; each selector switch group comprises a plurality of selector switches, the plurality of selector switches in each selector switch group are in a one-to-one correspondence with the plurality of storage capacitors in the corresponding storage capacitor group, output ends of the selector switches are electrically connected to second polar plates of the corresponding storage capacitors, and input ends of the selector switches are electrically connected to shift output ends of corresponding first shift units; and a plurality of selection signal lines, wherein the plurality of selection signal lines are disposed in a one-to-one correspondence with the plurality of selector switch groups, and the selection signal lines are electrically connected to control ends of the plurality of selector switches in the corresponding selector switch groups; and sending the control signal by the drive chip to the signal line repair module comprises sending a selection signal to the selection signal line, so that the connection switch electrically connected to the selection signal line transmitting the selection signal is turned on, and an enable signal output by the first shift unit is transmitted to a control end of a corresponding connection switch, so that the corresponding connection switch is turned on.

7. The display apparatus according to claim 6, wherein one repair line is reused as a detection line, and a time for electrical connection between the repair line reused as the detection line and a disconnected signal line and repair of the disconnected signal line is later than a time for electrical connection between another repair line and the disconnected signal line and repair of the disconnected signal line.

8. The display apparatus according to claim 6, wherein all the repair lines are reused as detection lines.

9. An electronic device, comprising the display apparatus according to claim 1.

10. A drive chip, wherein the drive chip is configured to:

provide a signal to a plurality of signal lines to control sub-pixels to perform light-emitting display; and when determining that a disconnected signal line exists, provide a control signal to enable the disconnected signal line to be electrically connected to a repair line in a signal line repair module, wherein providing the control signal to enable the disconnected signal line to be electrically connected to the repair line in the signal line repair module comprises: sending a control signal to the signal line repair module, to control a shift output end of a first shift unit corresponding to the disconnected signal line to output an enable signal, and control a corresponding connection switch in a connection switch group to be turned on, so that the disconnected signal line is electrically connected to the repair line, wherein sending the control signal by the drive chip to the signal line repair module comprises:

sending a selection signal to the selection signal line, so that the connection switch electrically connected to the selection signal line transmitting the selection signal is turned on, and an enable signal output by the first shift unit is transmitted to a control end of a corresponding connection switch, so that the corresponding connection switch is turned on.

* * * * *